(12) United States Patent
Manuel-Devadoss et al.

(10) Patent No.: US 9,154,383 B2
(45) Date of Patent: Oct. 6, 2015

(54) SYSTEM AND METHOD TO EXTEND THE CAPABILITIES OF A WEB BROWSER OF A WEB APPLICATION ISSUE ROOT CAUSE DETERMINATION TECHNIQUES

(71) Applicants: Johnson Manuel-Devadoss, Pearland, TX (US); Christy Aarthi Jones, Pearland, TX (US)

(72) Inventors: Johnson Manuel-Devadoss, Pearland, TX (US); Christy Aarthi Jones, Pearland, TX (US)

(73) Assignee: Johnson Manuel-Devadoss, Pearland, TX (US)

(*) Notice: Subject to any disclaimer, the term of this patent is extended or adjusted under 35 U.S.C. 154(b) by 183 days.

(21) Appl. No.: 14/140,916

(22) Filed: Dec. 26, 2013

(65) Prior Publication Data

US 2014/0189435 A1 Jul. 3, 2014

Related U.S. Application Data

(60) Provisional application No. 61/747,675, filed on Dec. 31, 2012.

(51) Int. Cl.
*G06F 11/00* (2006.01)
*H04L 12/24* (2006.01)
*G06F 11/30* (2006.01)
*H04L 12/26* (2006.01)
*H04L 29/08* (2006.01)

(52) U.S. Cl.
CPC ............ *H04L 41/12* (2013.01); *G06F 11/30* (2013.01); *H04L 41/0253* (2013.01); *H04L 43/10* (2013.01); *H04L 67/02* (2013.01); *H04L 41/0213* (2013.01); *H04L 41/046* (2013.01)

(58) Field of Classification Search
USPC ........................................................ 714/46
See application file for complete search history.

(56) References Cited

U.S. PATENT DOCUMENTS

| | | | |
|---|---|---|---|
| 8,156,378 B1* | 4/2012 | Suit ..................... | G06F 11/0709 714/26 |
| 2003/0110252 A1* | 6/2003 | Yang-Huffman ... | H04L 12/2602 709/224 |
| 2005/0240798 A1* | 10/2005 | Benedek ............... | G06F 11/079 714/38.11 |
| 2008/0126858 A1* | 5/2008 | Barras ................... | G06F 11/327 714/25 |
| 2011/0271149 A1* | 11/2011 | Roussel ............... | H04L 41/0253 714/46 |
| 2012/0101778 A1* | 4/2012 | Gyota ................. | F24F 11/0086 702/183 |
| 2014/0086073 A1* | 3/2014 | Baykal ............... | H04L 41/5038 370/252 |

* cited by examiner

*Primary Examiner* — Sarai Butler

(57) ABSTRACT

Disclosed is a system and method for extending the web application root cause determination functionality to a web browser. In one aspect, the present invention plots the network topology diagram for the web application by executing network trace commands. In another aspect, the present invention allows user to upload their web application network topology diagram. In another aspect, the present invention allows user to build their web application network topology diagram using UI Devices Toolkit. The present invention collects the information relating to the web application issue from various entities such as network infrastructure devices, servers through ICMP, SNMP, TRAP, SYS/APPLOG, HTTP and Network traffic analysis. In one aspect, the present invention highlights the entity in the web application network topology diagram based on the collected information and provides the experts recommended suggestion for the issue through Internet web search query.

14 Claims, 20 Drawing Sheets

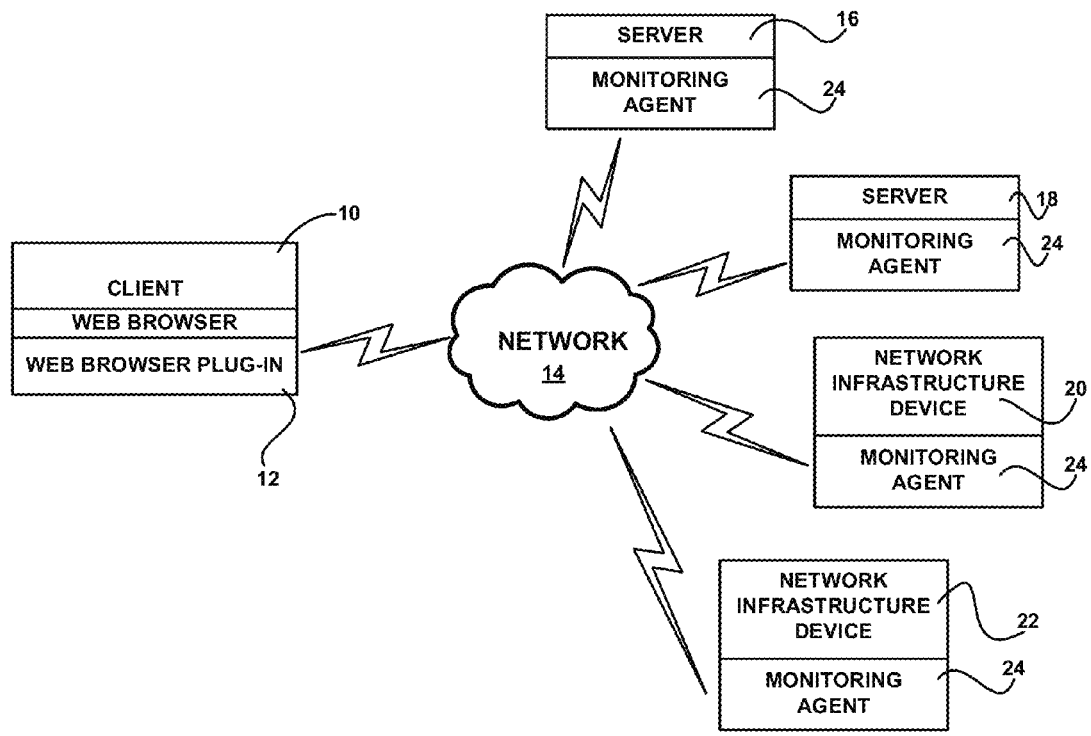
FIG. 1.a
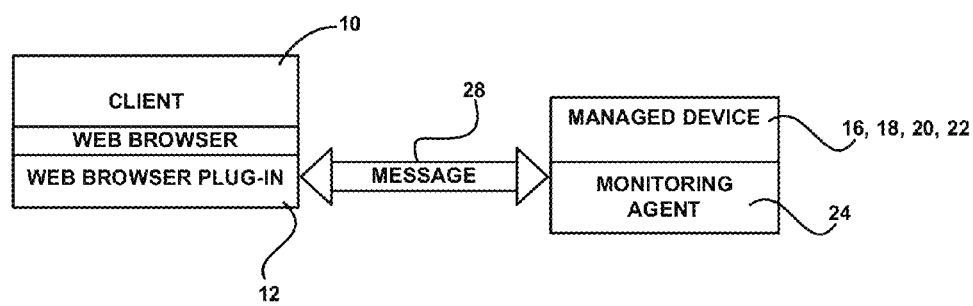
FIG. 1.b

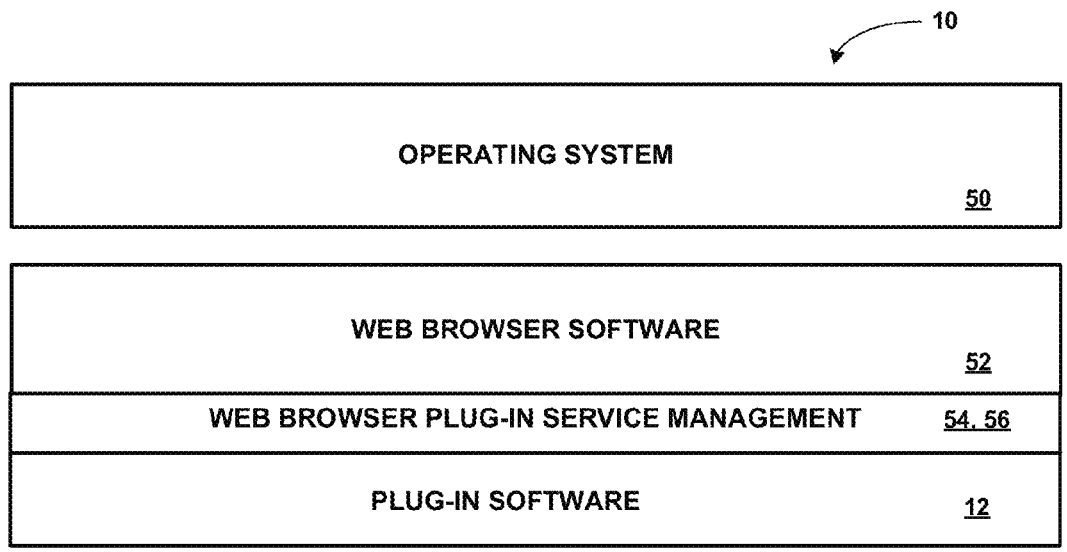
FIG. 1.c
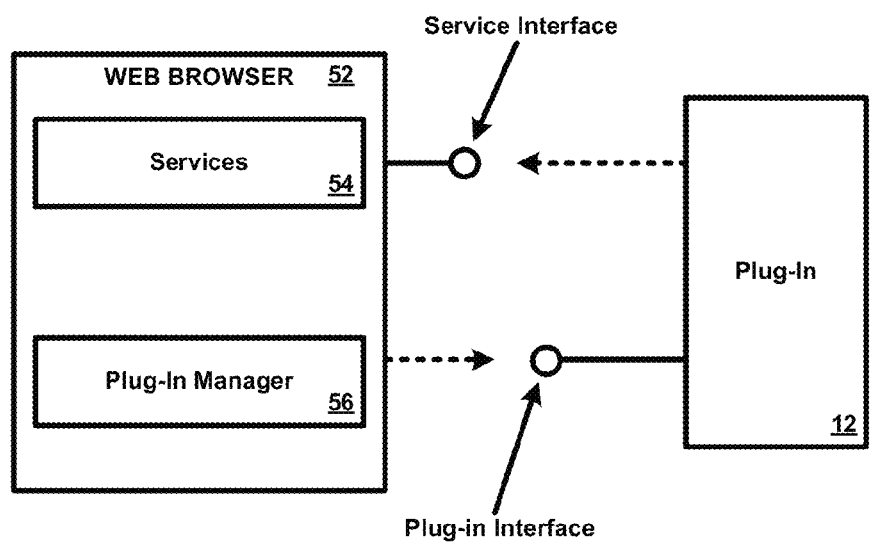
FIG. 1.d

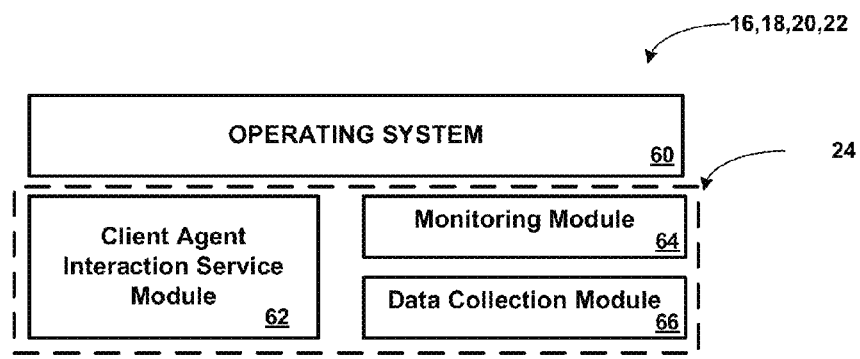
FIG. 1.e
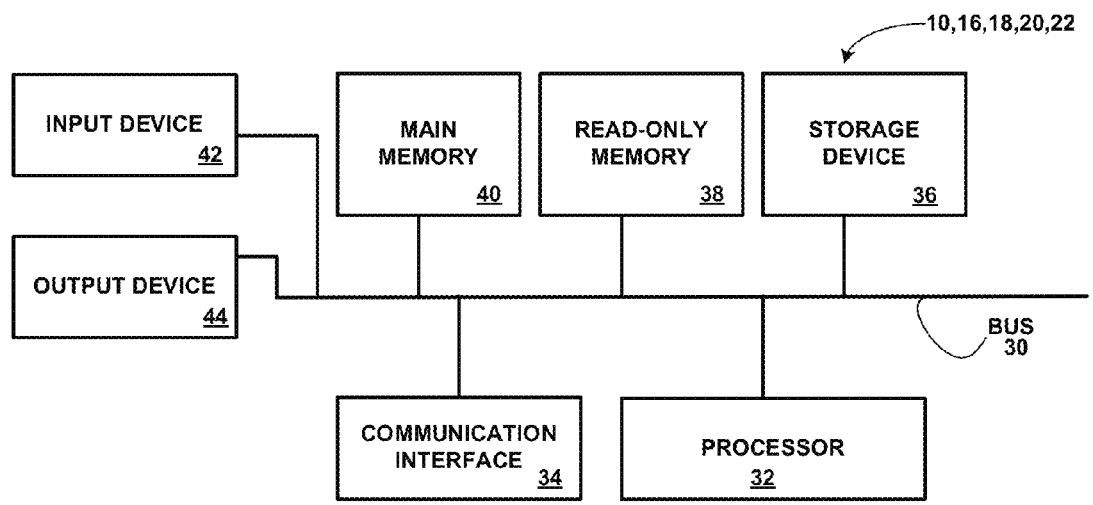
FIG. 1.f

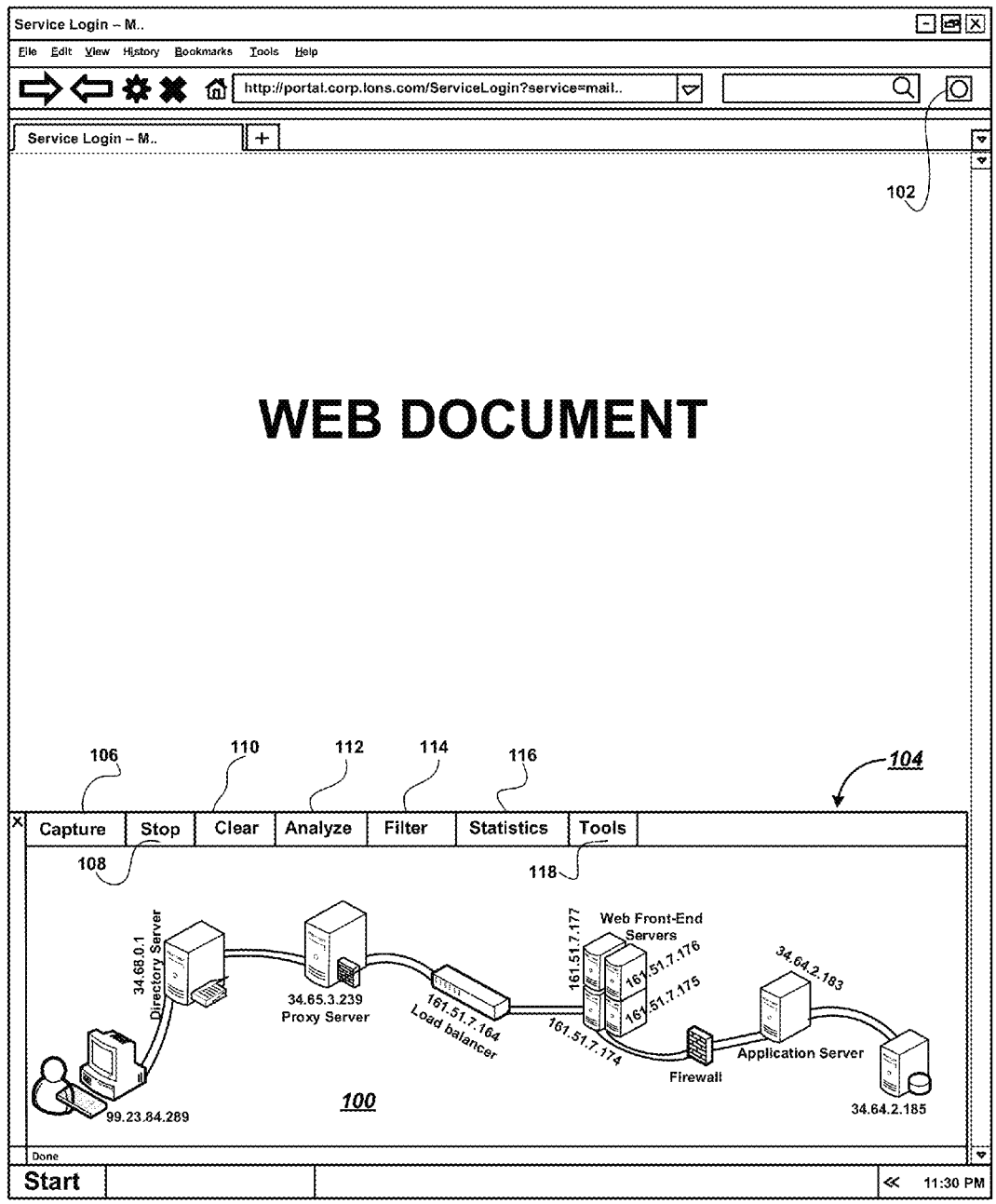
FIG. 1.g

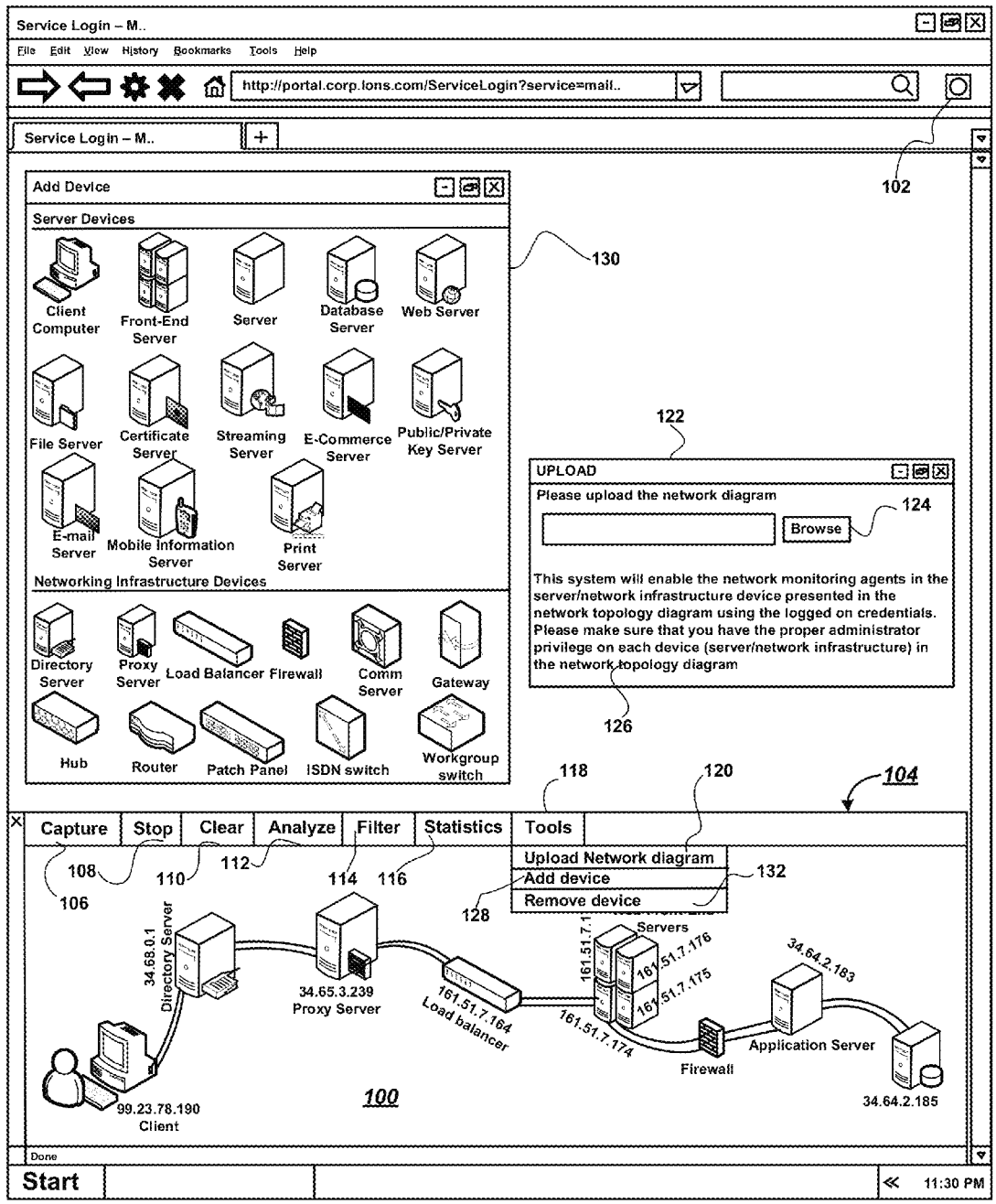
FIG. 1.h

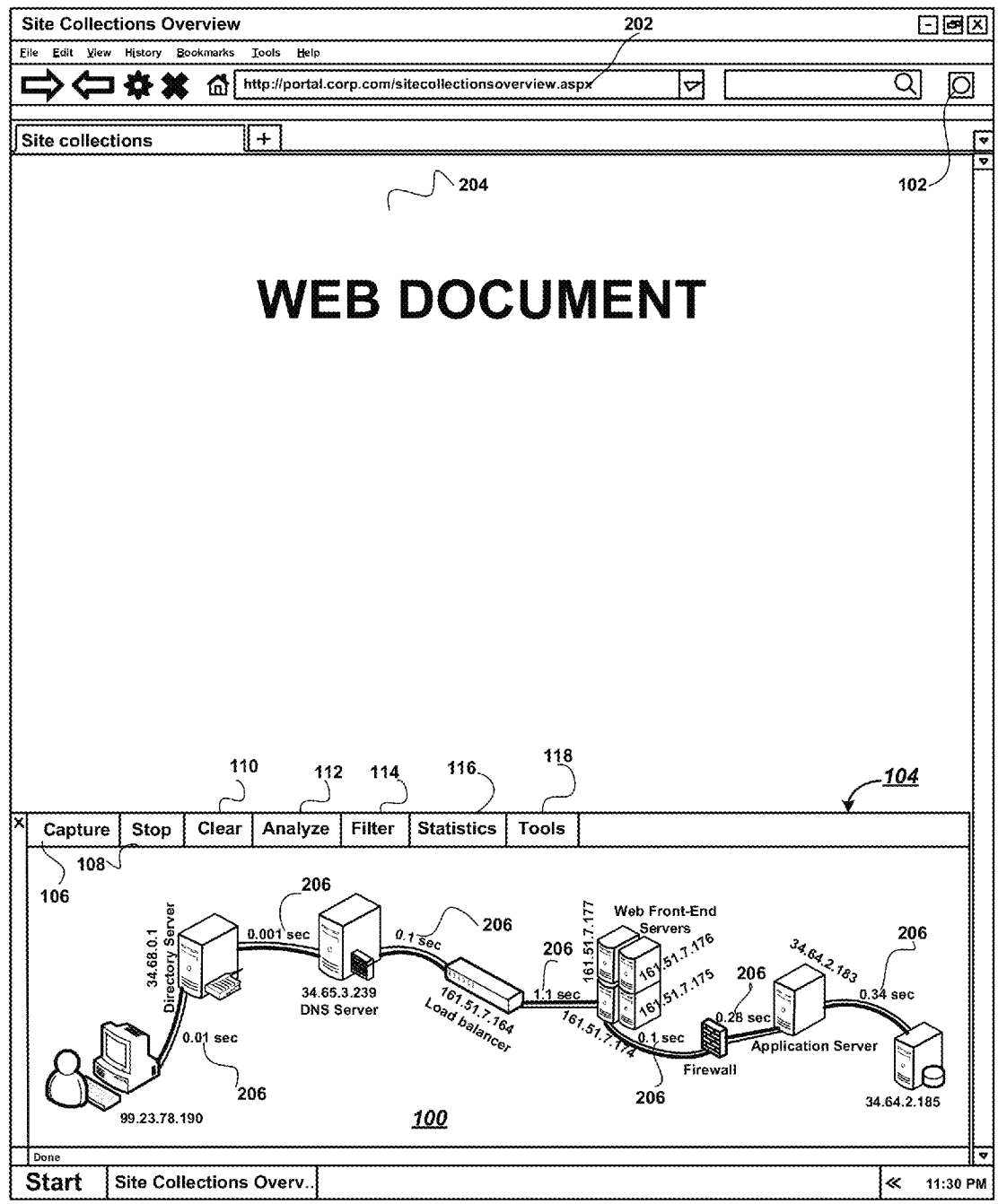
FIG. 2.a

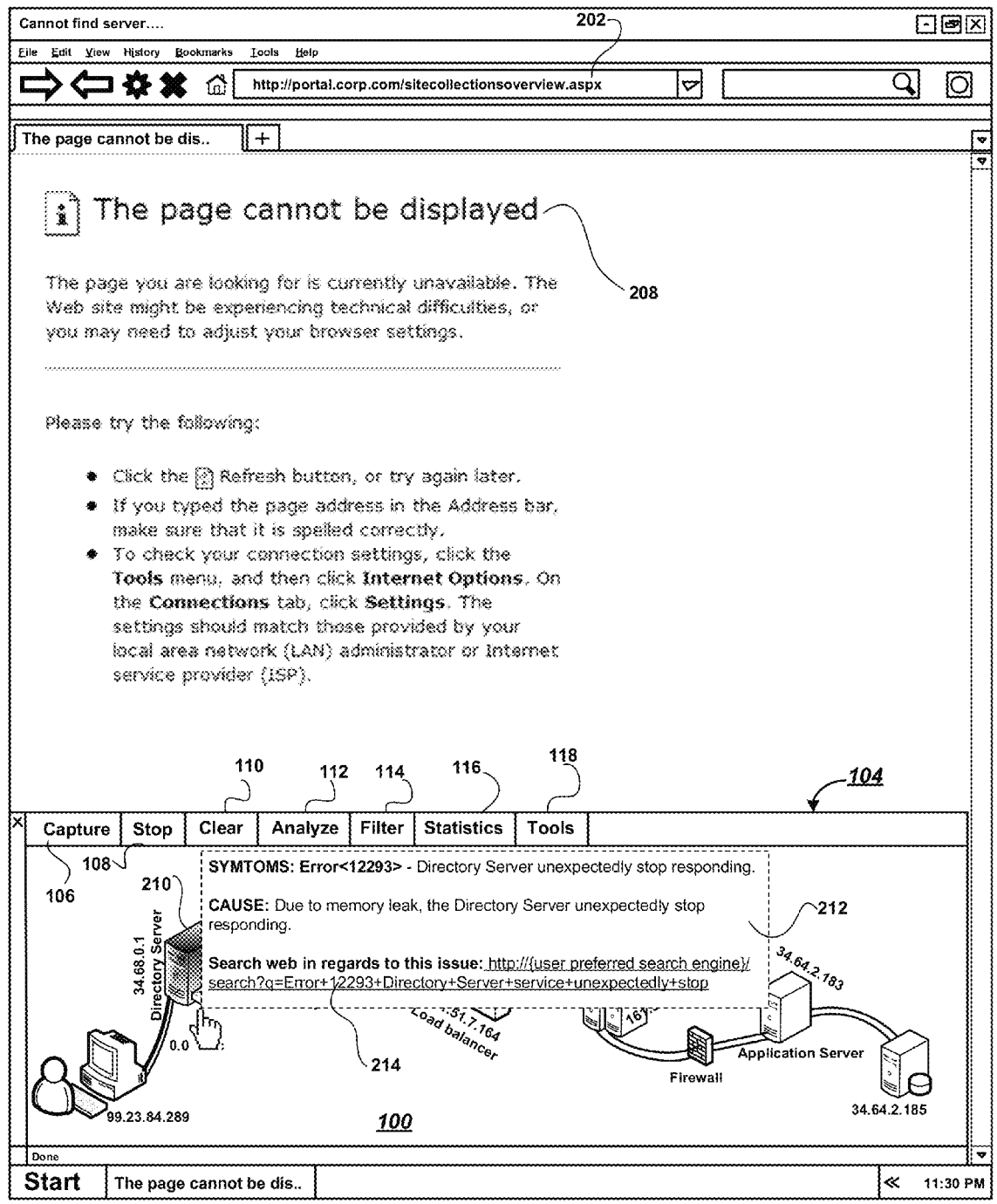
FIG. 2.b

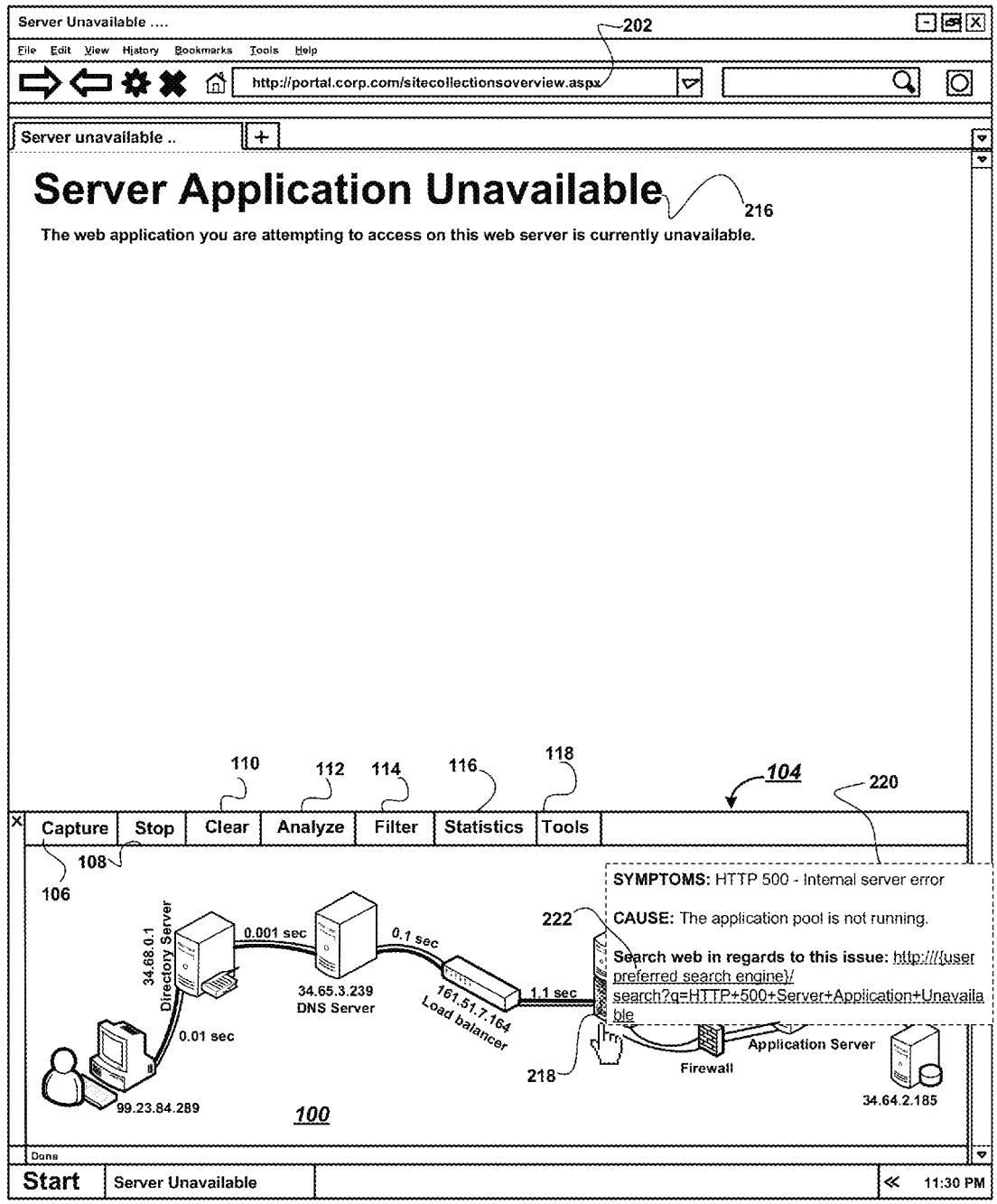
FIG. 2.c

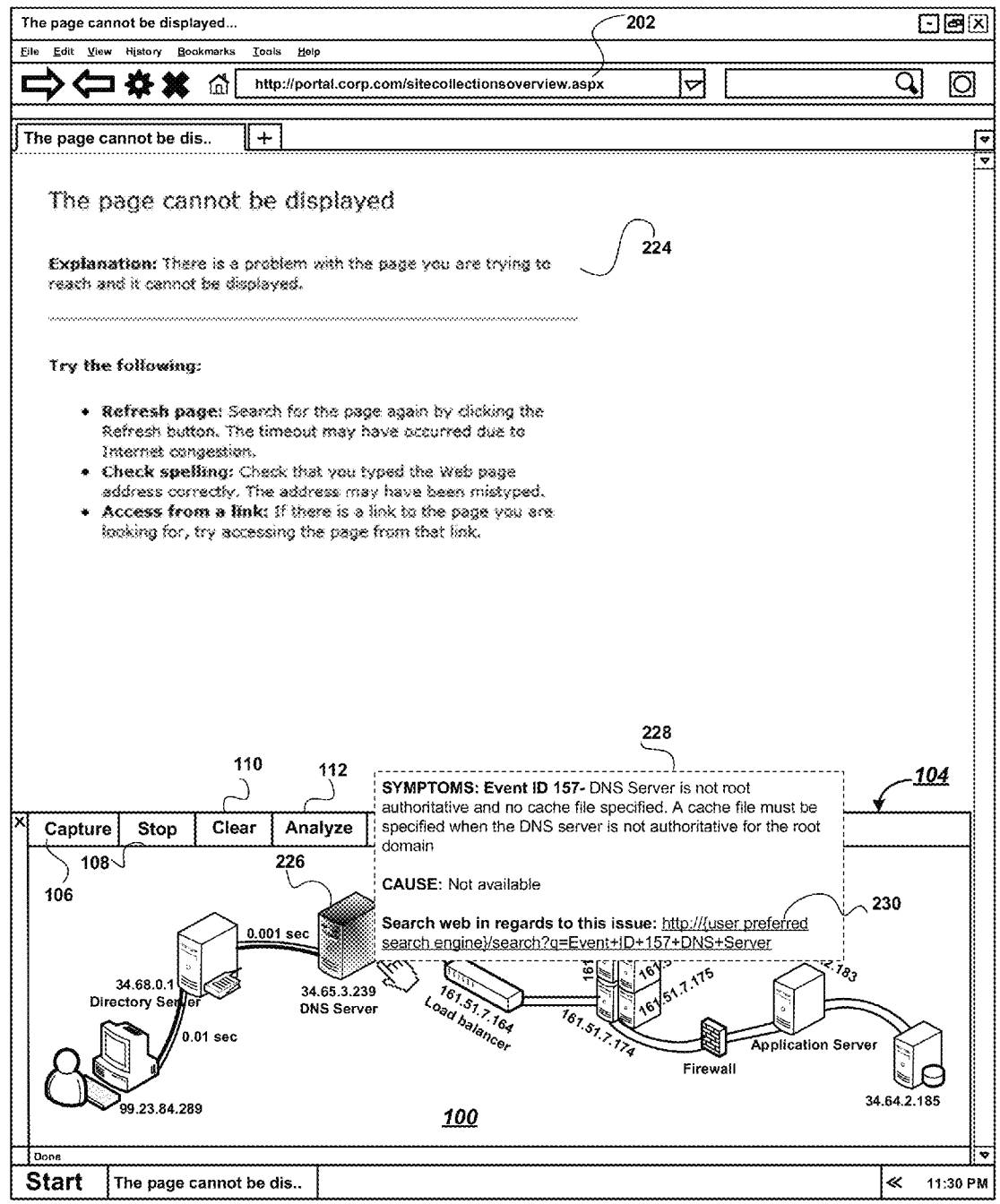
FIG. 2.d

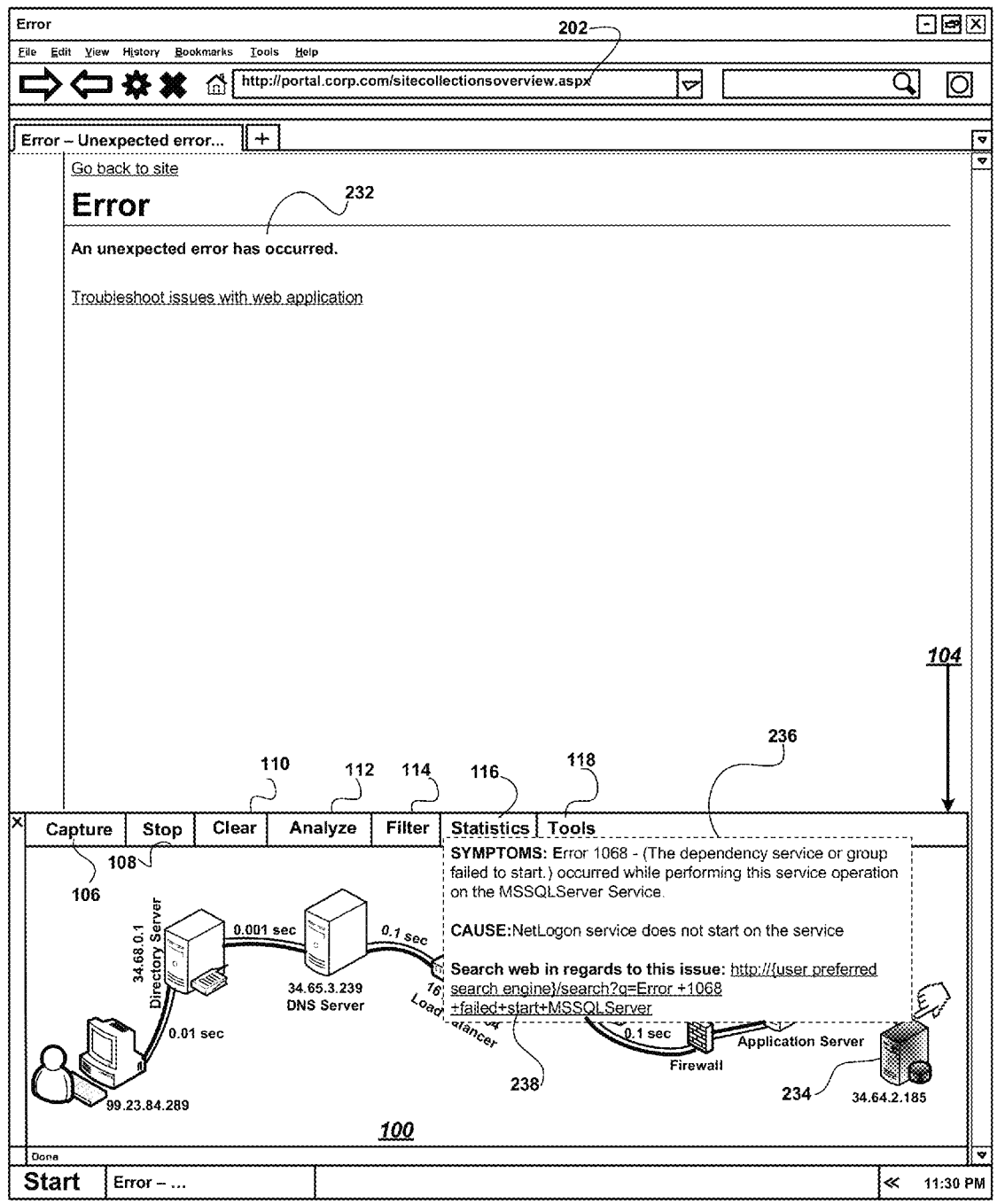
FIG. 2.e

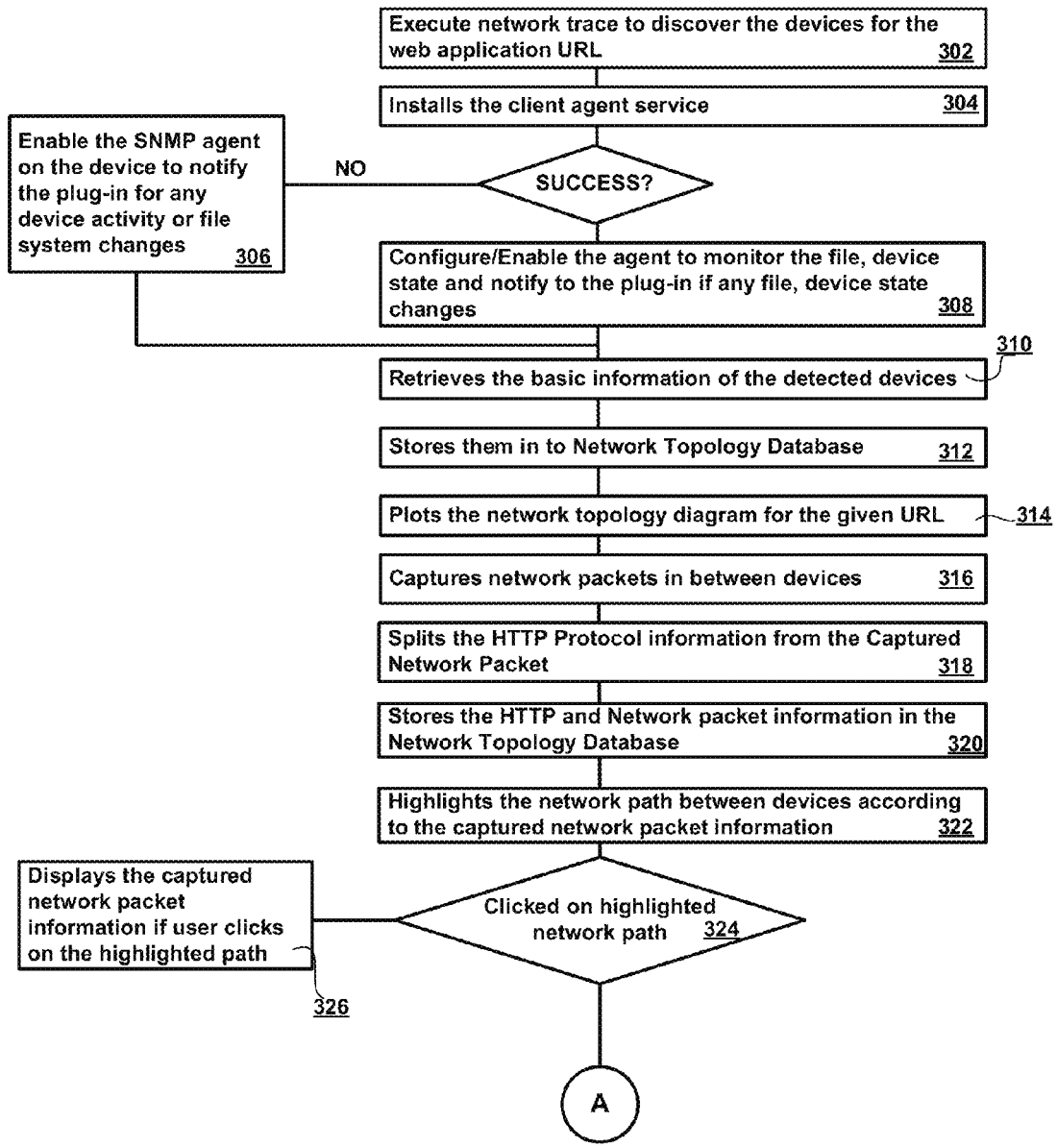
FIG. 3.a

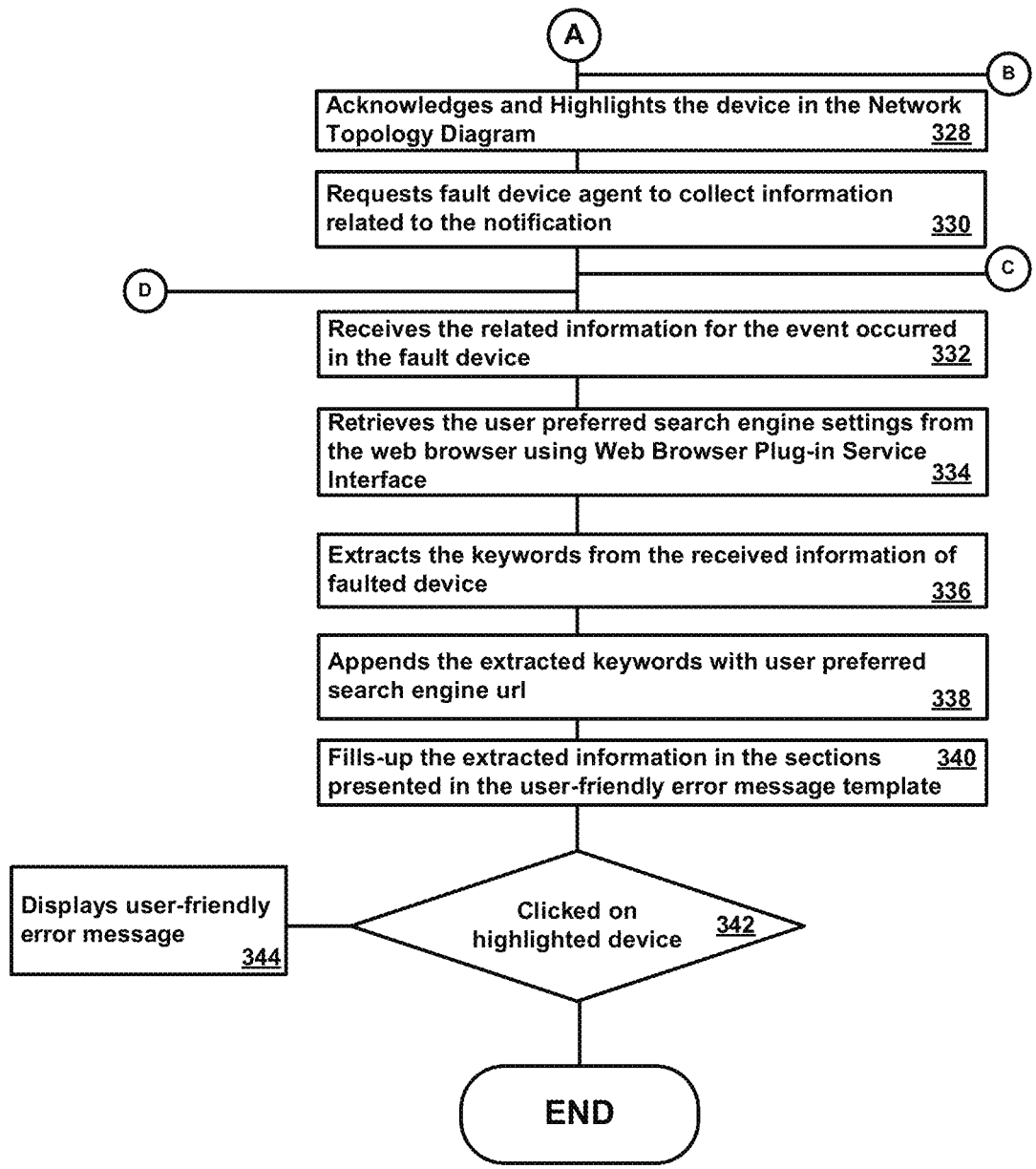
FIG. 3.b

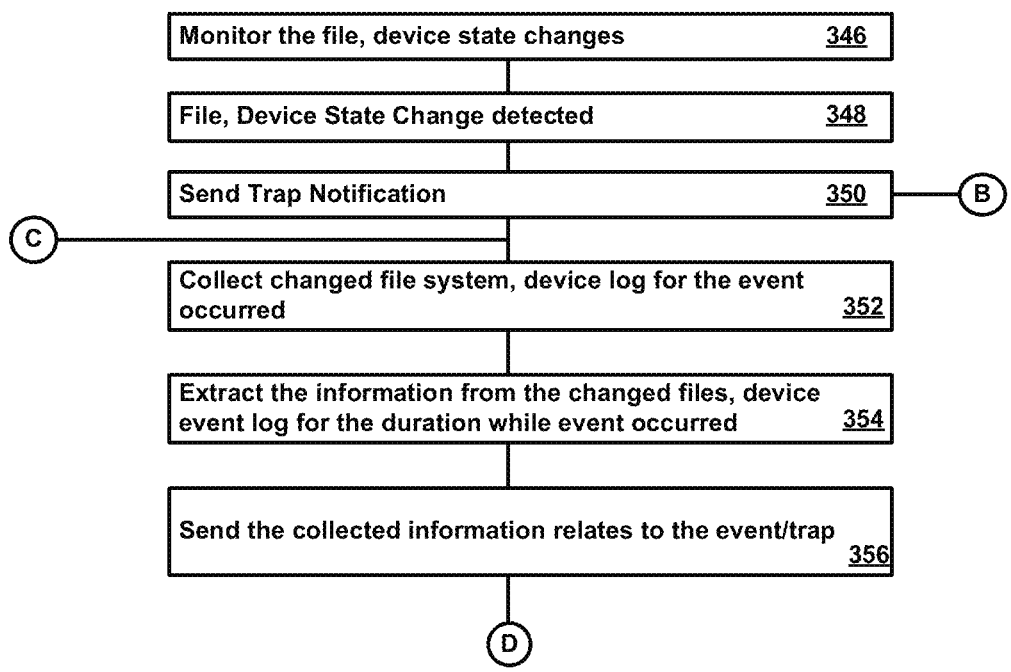
FIG. 3.c

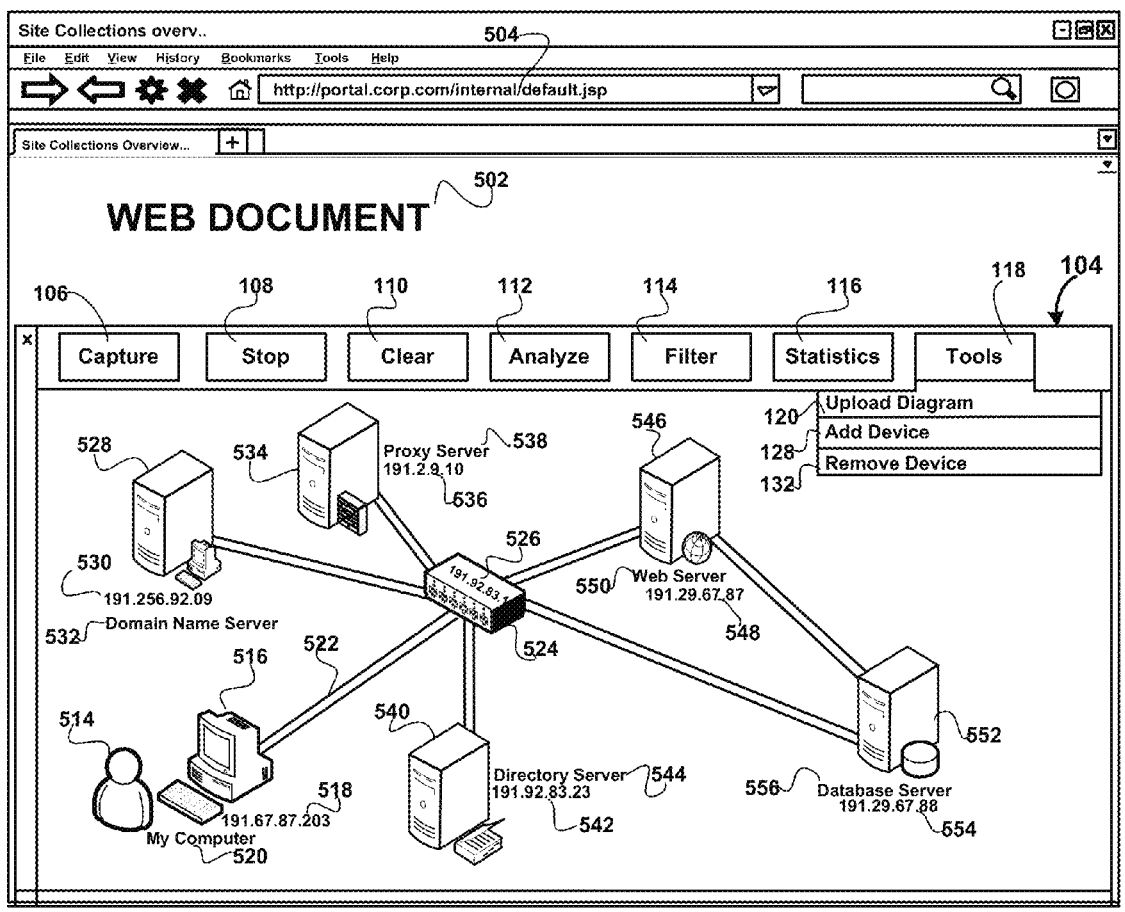
FIG. 5.a

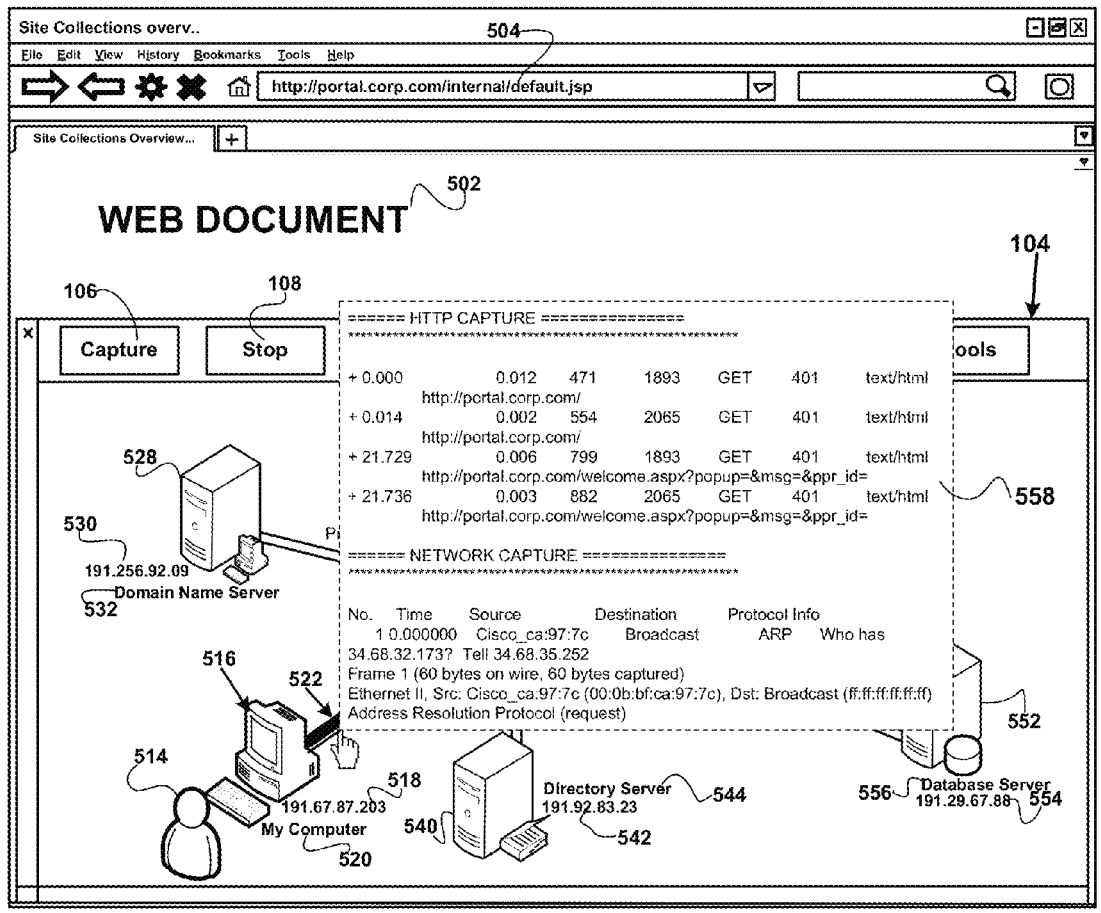
FIG. 5.b

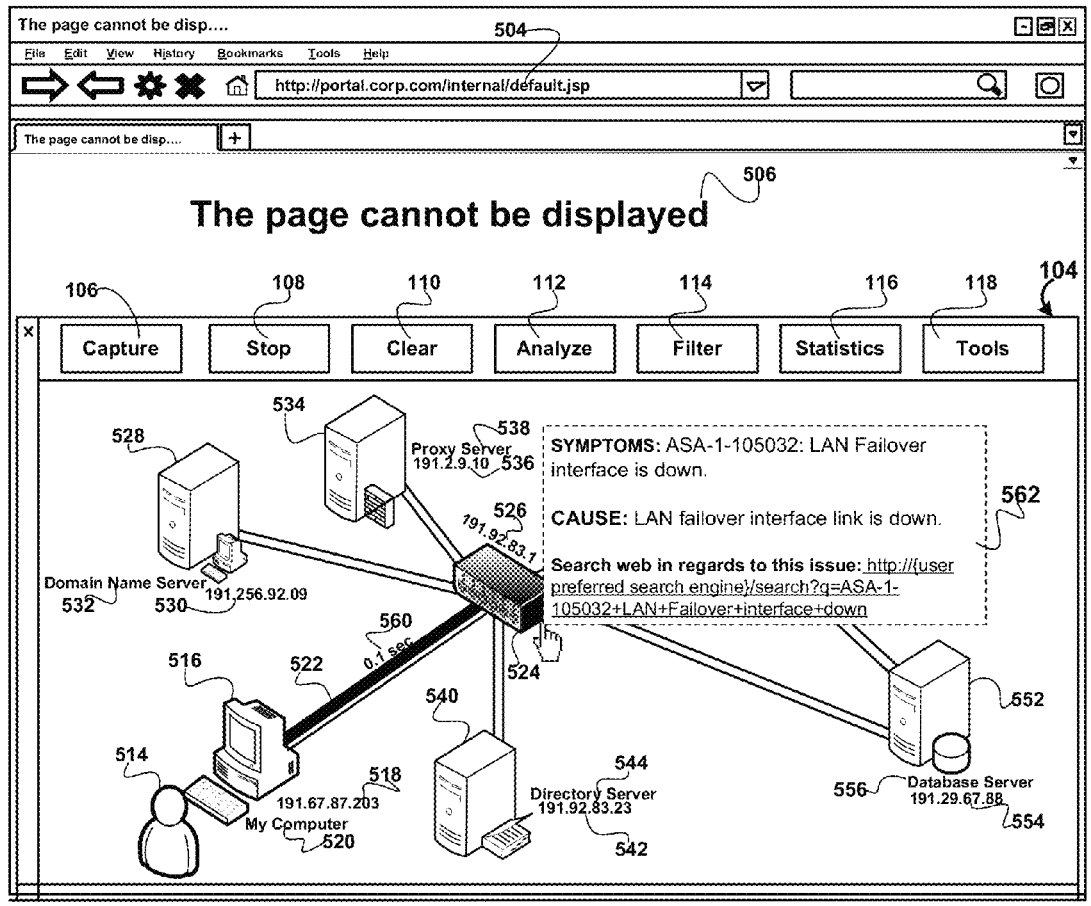
FIG. 5.c

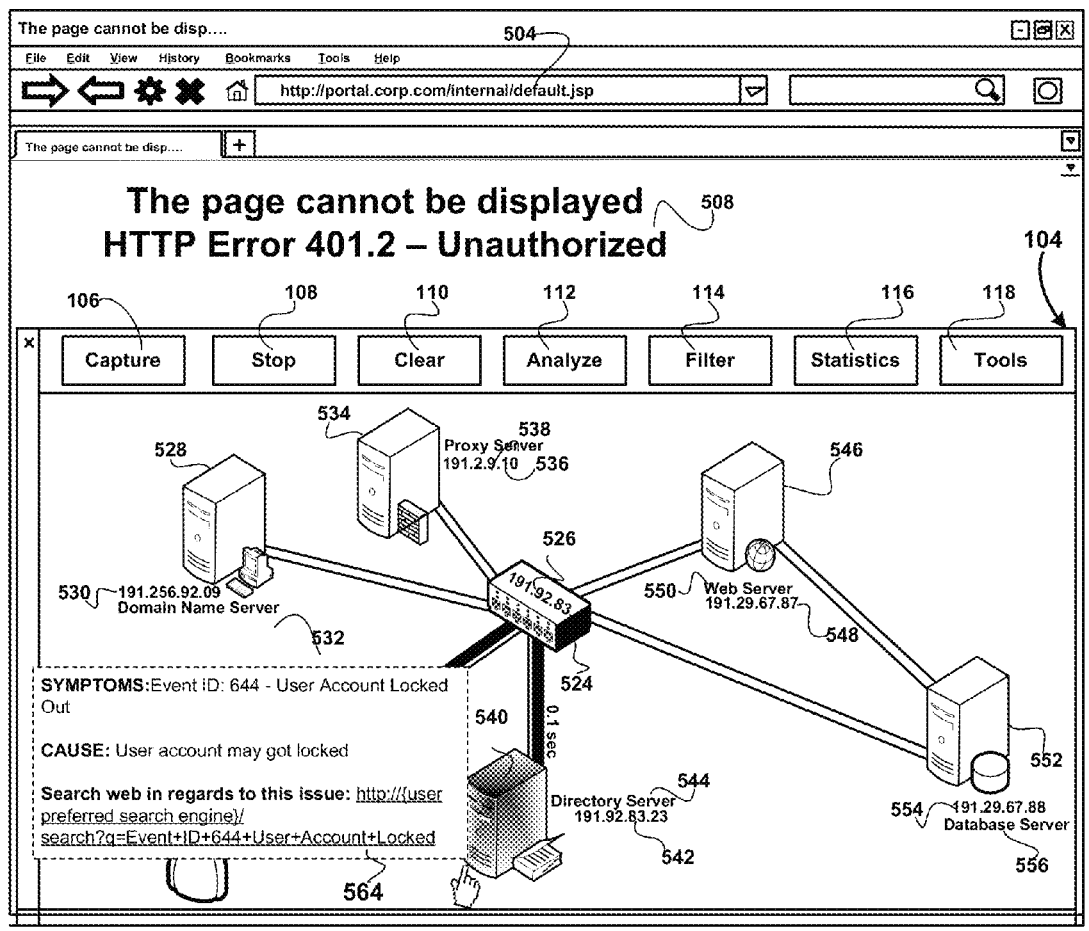
FIG. 5.d

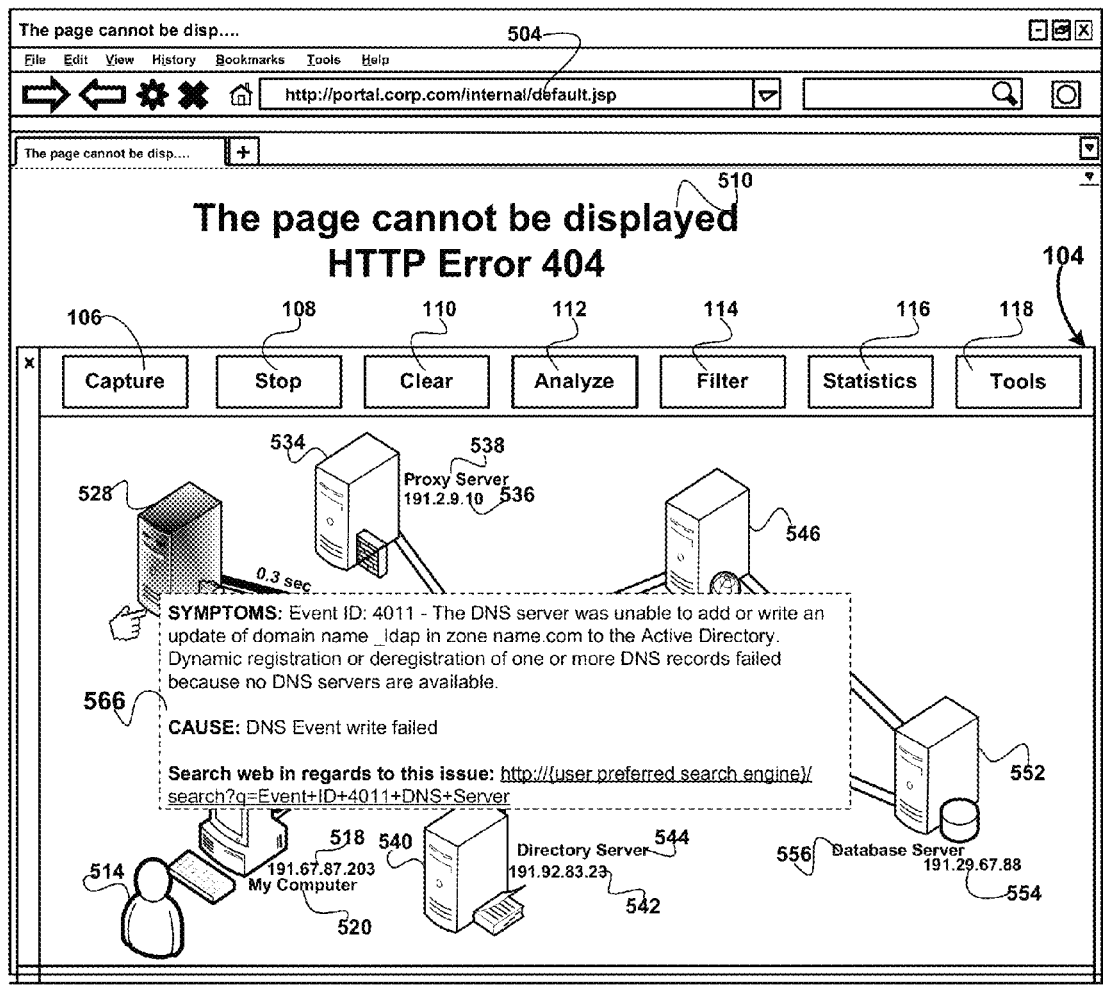
FIG. 5.e

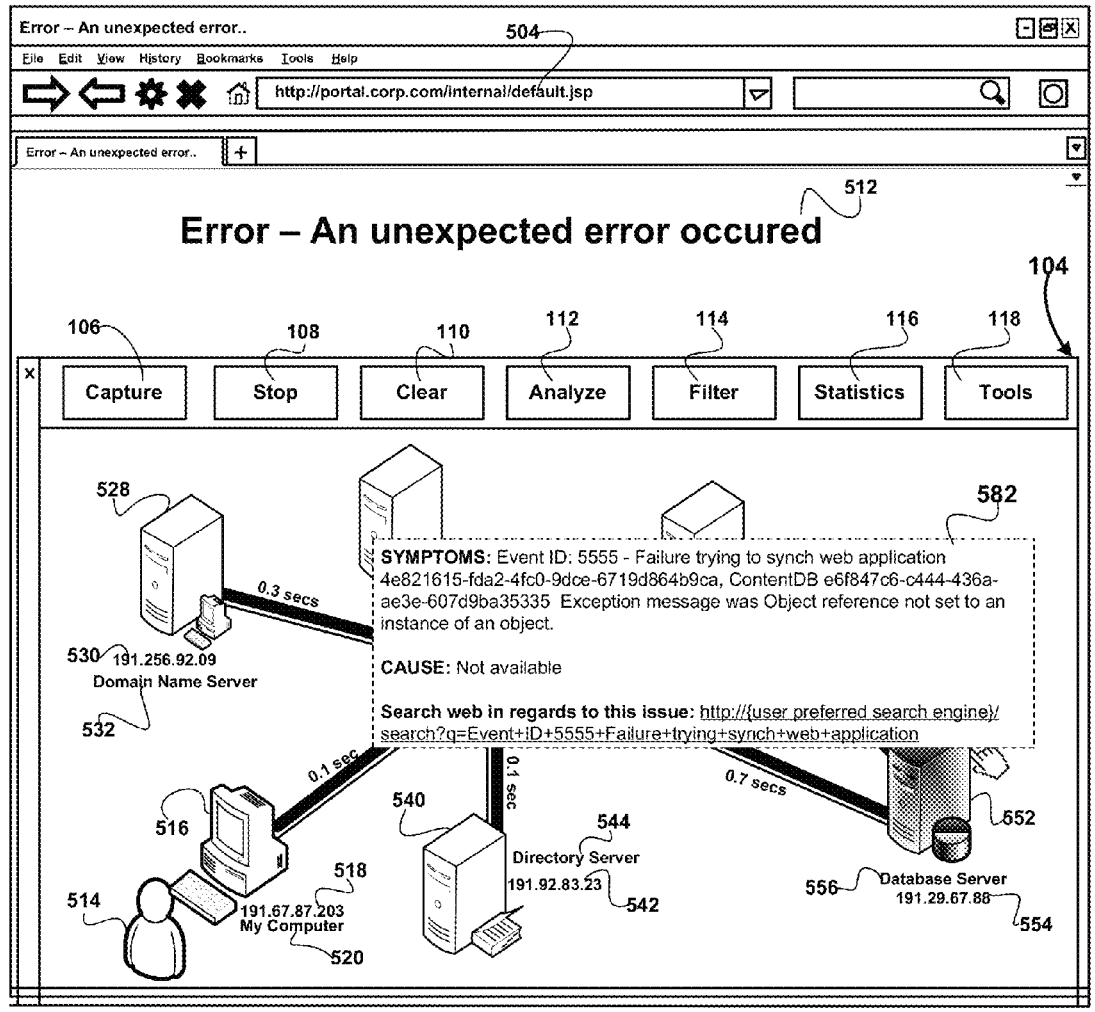
FIG. 5.f

SYSTEM AND METHOD TO EXTEND THE CAPABILITIES OF A WEB BROWSER OF A WEB APPLICATION ISSUE ROOT CAUSE DETERMINATION TECHNIQUES

RELATED APPLICATIONS

This application claims the benefit of U.S. Patent Application Ser. No. 61/747,675, filed on Dec. 31, 2012, the entire contents of which are hereby incorporated by reference.

BACKGROUND OF THE INVENTION

1. Field of the Invention

The present invention relates generally to extend the capability of a web browser to determine the root cause for an issue occurred in the web application more specifically pin-point which entity causes the issue in the network topology diagram presented in the web browser plug-in panel window and provide suggestion web search query for the issue occurred in the web application.

2. Description of Related Art

In a real-time production environment, it is hard to identify the root cause for any critical issues like performance, security threats, broken authentication, security mis-configuration, etc. While participating in the investigation for the root cause, technical support team validates the issues in production environment, using the structured monitoring, and operations processes according to the established frameworks such as Information Technology Infrastructure Library (ITIL), Information Technology (IT) Services Management, and Information Technology (IT) Operational Frameworks. The technical support team investigates the root cause by troubleshooting the possible devices, such as network infrastructure device, application servers and database server. Using common troubleshooting and diagnostic tools such as Performance Monitor and diagnostic approaches such as cause/effect diagrams, it is real hard for technical support team to identify the root cause and resolution for the issue.

In order to find where exactly issue is occurring or to find the root cause of web application issue, the web application support team needs to depend on multiple team members from network infrastructure team, database team and computer server team. The web application support team needs to look for their appropriate time to discuss the issue. In addition, they need to spend a lot of time doing information gathering about the web application and the issue prior to actually identifying the root cause and troubleshooting the issue. Thus, it could take several days to resolve a simple issue in production environment.

A traditional web browser does not provide the capability to find the root cause of web application issue. Although popular browser extensions such Firebug, HTTPWatch, Fiddler or Web Developer tools provides the ability to extend the web browser functionality for analyzing HTTP traffic and allowing inspect, edit and monitor CSS, HTML, JavaScript and Net requests in the web document. However, these extensions do not provide ability to pinpoint which component causes the issue and lack of providing information related to the issue outside of client computer.

However, there are multiple entities to be examined to determine the root cause of an issue, such entities are network infrastructure devices like Firewall, Load Balancer, Network Interface Card (NIC), and computer servers like web application server, Domain Name Server, Proxy Server and Database Server configuration, HTTP and Network Traffic analysis. There are multiple tools like network tracer, dump file analyzer, system log viewer, database profiler, log parser and HTTP analyzer that are available to intercept the issue in various aspects to find the root cause by the technical support team. Also, popular systems include OpenView® from Hewlett-Packard Corporation, Unicenter® from Computer Associates, IBM Tivoli® Framework exists for managing entire enterprise-level networks and application. Another example of such a system is the Solarwinds® Orion® Network Performance Monitor and Application Monitor. However, these systems does not provide the web browser extension that helps user to determine the root cause for an issue and does not pin-point on which component causes the issue and what are the recommended solution from internet experts for the specified issue.

In another aspect, these commercial systems provide a vast amount of information that requires special understanding of result codes. These codes cannot be interpreted easily by everyone and needs some additional knowledge. These systems show the time duration taken for the web pages to render, but does not provide the ability to show which device of the network infrastructure or computer server caused the delay or/and why it took that much amount of time to complete the web application request.

In addition, to determine the root cause, the web application support team needs to go the through log files of each network infrastructure device and the computer servers presented in the web application network topology diagram. Each log will be huge and may contain a lot of general logging information about the device. This general logging information is unrelated to the issue at hand. The vast content may make it harder for the web application support team to find and extract logging information related to the issue.

In order to use the diagnostic tools, web application support team needs to be trained to use these tools for finding the root cause. There is no such system or method to provide an easy and elegant way to identify the root cause of the issue at the client (i.e., application support team personnel) web browser plug-in panel without logging into the individual computer server or network infrastructure devices.

In order to overcome such problems, there is a need for a method or system to extend the web browser capabilities for identifying the root cause of web application issue and providing the experts recommendation for the issue through web search. Such systems disclosed in many U.S. patent applications and patent document but none of the system disclosed to provide the functionality via web browser plug-in.

In light of the shortcomings of the various currently available systems, there is still a need for a quick and simple method for identifying the issue occurred in a web application. In particular, there is an interest in a troubleshooting tool that allows a user to easily identify the issue and provide the possible workaround or resolution for the issue over the web browser.

SUMMARY

The following presents a simplified summary of the invention in order to provide a basic understanding of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention is computer implemented web browser plug-in software that assists the web application support team to identify where exactly the issue is being caused and what is the root cause of the issue in a graphical representation of the network topology diagram of the web application. The present invention gathers the entities of network topology in which the web application is deployed in several ways. In one embodiment, the present invention plots the network topology diagram for the web application by executing network trace commands using ICMP protocol to discover the various computer server and network infrastructure devices presented in the web application implementation. In some embodiments, the present invention provides the ability to upload a network topology diagram of the web application and then present invention extracts the information about computer server and network infrastructure devices from the uploaded network topology diagram. In some embodiments, the present invention provides the UI Devices Toolkit to plot the web application network topology diagram by adding/removing devices. The collected information from the network topology diagram of web application is stored in the database. Once all the computer server and network devices of the web application are identified, the network topology diagram is shown in the present invention (i.e., web browser plug-in) panel window.

The present invention looks for the network topology diagram of given web application when user initiates the principle operation of present invention using Capture button. The Capture button initiates the validation of provided entity information in the network topology diagram by executing the network trace using ICMP protocol for the given web application URL. The difference in detected devices for the given web application URL will be corrected in the network topology diagram. In some embodiments, the present invention initiates the network trace using ICMP protocol to detect the devices if no network topology diagram is presented and plots the network topology diagram according to the detected devices. In one embodiment, the present invention installs the client service agent on the detected devices. If any device refuses or present invention is not able to install the client service agent on a particular device then present invention enables the monitoring agent on the device to notify to the present invention if any event occurred during the web application issue. Each client service agents are configured to monitor and report to the present invention if device activities and file system changes during the web application issue. Once the prerequisites have been established then present invention initiates the network trace between the devices and highlights the network path in the network topology diagram accordingly. The HTTP related trace information is extracted from the captured network packets and stored in the database. This information will be displayed when user clicks on the highlighted network path from the network topology diagram.

During a web application issue, if any Client Service or monitoring agent detects activity changes in the device then it will notify to the present invention. In response to the notification, the present invention highlights the notified device in the network topology diagram. The present invention further collects more information about the activity or file system changes in the device. The collected information is being evaluated and schematized to build a user-friendly message for the event occurred in the device. The user-friendly message may contain symptoms, cause, files changed during the event and suggestion using user-preferred web search engine. The user-preferred web search engine settings are retrieved from the web browser where the present invention is going to used. The present invention displays the custom notification on-demand basis when user clicks on the highlighted server/network infrastructure device.

Accordingly, it is a principal object of the invention to assist the web application support team by extending the web browser functionality on identifying the root cause for the issues in the web application.

It is an object of the invention to provide improved method thereof in a system for the purposes described which is inexpensive, dependable, and fully effective in accomplishing its intended purposes.

It is an object of the invention to provide a web browser plug-in that helps to highlight the graphical path between the server/network infrastructure devices of web application as the web request is serviced.

It is an object of the invention, to allow user to build the network topology diagram by adding or removing the graphical representation of server/network infrastructure device to/from the network topology diagram of the web application.

It is an object of the invention to allow a user to quickly identify the issue by providing the exception log information for the critical activity when the user clicks on the device during the time interval of the request.

Still another object of the invention is to suggest the experts recommended solution for the issue in the web application by providing web search query URL with corresponding error code or description.

This summary is provided to introduce the subject matter of determining the root cause of an issue in the web application, these and other objects of the present invention will become readily apparent upon further review of the following detailed description and drawings.

BRIEF DESCRIPTION OF THE DRAWINGS

The above and other aspects and advantages of the invention will be apparent upon consideration of the following detailed description, taken in conjunction with accompanying drawings, in which like reference characters refer to like parts throughout, and in which:

FIG. 1.*a* is an exemplary diagram of a network in which systems and methods consistent with the principles of the invention may be implemented;

FIG. 1.*b* is an exemplary diagram of network and exchanging of messages between Network management system and a Monitoring agent;

FIG. 1.*c* is a diagram of a portion of an exemplary computer readable medium that may be used by a client of FIG. 1.*a;*

FIG. 1.*d* is an exemplary diagram of Web Brower Plug-In Framework in which systems and methods consistent with the principles of the invention may be implemented;

FIG. 1.*e* is a diagram of a portion of an exemplary computer readable medium that may be used by a server or network infrastructure device of FIG. 1.*a;*

FIG. 1.*f* is a diagram of a portion of an exemplary computer readable medium that may be used by a client or server or network infrastructure device of FIG. 1.*a*

FIG. 1.*g* shows an exemplary graphical user interface associated with building a network topology diagram for the web application in accordance with various embodiments of the invention;

FIG. 1.*h* shows an exemplary graphical user interface associated with building a network topology diagram for the web application using UI Devices Toolkit and uploading the network topology diagram for the web application in accordance with various embodiments of the invention;

FIG. 2.*a* illustrates an example of present invention for the web application showing the time taken to reach each device in the network topology diagram in accordance with various embodiments of the invention;

FIG. 2.b illustrates an example of the present invention highlighting the Directory Server for there is an adverse issue detected in Directory Server which causes the error displayed in the web browser window;

FIG. 2.c illustrates an example of the present invention highlighting the web application server caused an issue for the error displayed in the web browser window;

FIG. 2.d illustrates an example of the present invention highlighting the DNS server for there is an activity detected in DNS server system event log which causes the web application to stop working;

FIG. 2.e illustrates an another example of the present invention identifies the netlogon service does not start on the database server which cause the web application to stop functioning;

FIG. 3.a is a flowchart of exemplary processing for generating and displaying the network topology diagram for the given web application URL and HTTP and Network data capture events according to some embodiments of the invention;

FIG. 3.b is a flowchart of exemplary processing for after receiving the notification from fault device according to some embodiments of the invention;

FIG. 3.c. is a flowchart of the principle of operation of Client Service Agent in accordance to the present invention;

FIGS. 5.a-5.f are diagrams that illustrate exemplary processing according to the web application hosted in the internal network with the principles of the invention, FIG. 5.a illustrates the details of each device present in the network topology diagram for the web application displayed in the web browser window, FIG. 5.b illustrates the present invention highlighting the network path between user computer and network switch, also present invention displays the detailed information of captured network and HTTP packet when user clicked on the highlighted path, FIG. 5.c illustrates an example of present invention highlighting the network switch, as an adverse event on network interface card was detected during the web request, FIG. 5.d illustrates another example of present invention highlighting the directory server for the error displayed in the web browser plug-in display window as an event log entry change detected during the user logon, FIG. 5.e illustrates another example of present invention highlighting the Domain Name Server (DNS) for the error displayed in the web browser plug-in display window as there is an adverse event detected at the domain name server, FIG. 5.f illustrates another example of present invention highlighting the Database Server for the error displayed in the web browser plug-in display window as there is an adverse event detected at the database server.

DETAILED DESCRIPTION

Figure 4:
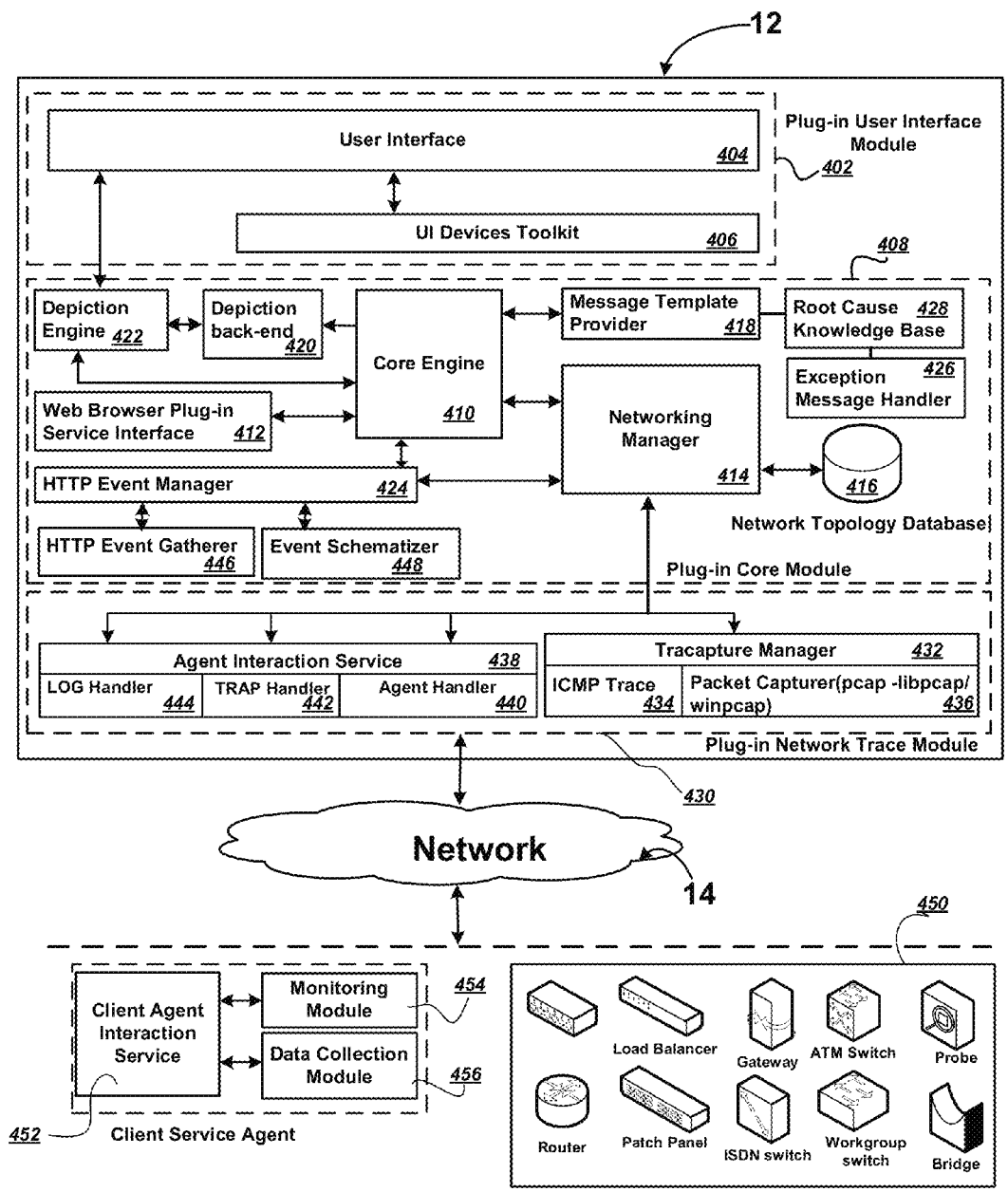
FIG. 4. illustrates a block diagram of a web browser plug-in of the present invention in accordance with various embodiments of the invention.

The exemplary embodiments described herein detail for illustrative purposes and are subject to many variations in structure and design. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used herein, the term "entity" or "device" or "managed device" means Server or Network Infrastructure device and "database" means Network Topology Database. It will further be understood that the terms "comprises" and/or "comprising," when used in this specification, specify the presence of stated features, steps, operations, elements, and/or devices, but do not preclude the presence or addition of one or more other features, steps, operations, elements, devices, and/or groups thereof.

FIG. 1.a is an exemplary diagram of a computer network in which system and method consistent with the principles of the invention may be implemented. Network 14 may include the client 10 connected to multiple servers 16, 18 and network infrastructure devices 20, 22 through Network 14. A client 10 and two servers 16, 18 and two network infrastructure devices 20, 22 have been illustrated as connected to Network 14 for simplicity. In practice, there may be more or fewer servers and network infrastructure devices.

FIG. 1.b is an exemplary diagram of Client 10 showing Messages 28 communicating with Managed Devices 16, 18, 20 and 22 in Network 14. Client 10 includes client entities with Web Browser and Web Browser extension Plug-In 12 software and executes applications to monitor the Managed Devices. Managed Devices may include entities Network Infrastructure Devices 20, 22 and Servers 16, 18. Managed Devices includes the Monitoring Agent 24.

The Network Management Protocol (NMP) is used for exchanging of messages between a Web Browser Plug-in 12 and Monitoring Agent 24. The Monitoring Agent 24 may include SNMP agent or Remote Network Monitoring (RMON) Probe or Client Service Agent installed by the present invention. The Web Browser Plug-in 12 acts as Network Management System (NMS) that sends Messages to Monitoring Agent 24 in various Managed Devices. The Monitoring Agent 24 employs a small set of commands to exchange information. The Web Browser Plug-in 12 sends request messages to query against the Monitoring Agent 24 and the Monitoring Agent 24 responds by sending response messages with the values for the requested variables. The Monitoring Agent 24 can also respond by sending trap messages and report occurrence of certain events to the Web Browser Plug-In 12 (NMS).

Client 10 may be defined as a device, such as a personal computer, a wireless telephone, a personal digital assistant (PDA), a laptop or another type of computation or communication device, a thread or process running on one of these devices, and/or an object executable by one of these devices.

Monitoring Agent 24 may be defined as a software program readable by a machine, tangibly embodying a program of instructions executable by the machine to collect the data from device and reports the data, as needed, to the Web Browser Plug-In (NMS) 12. Monitoring Agent 24 may include a Simple Network Management Protocol (SNMP) agent or Remote Network Monitoring (RMON) probe, and/or an executable software program to collect active and passive measurements about the device.

Network 14 may include a local area network (LAN), a wide area network (WAN), a telephone network, such as the Public Switched Telephone Network (PSTN), an Intranet, the Internet, or a combination of networks. Client 10, servers 16, 18 and Network Infrastructure Devices 20, 22 may connect to Network 14 via wired, wireless, and/or optical connections.

Network Infrastructure Devices 20, 22 may include a network-managed entity. A network-managed entity may be defined as a device, such as a Router, a Switch, a Gateway, a Bridge, a Proxy Server, a Firewall, a Network Address Translator, a Protocol Converter, a Wireless Network Interface Controller, a Modem, a bridge router, a multiplexer, an ISDN terminal adapter, a line driver, a digital media receiver, a thread or process running on one of these devices, and/or an object executable by one of these devices.

Servers 16, 18 may include a server-managed entity. A server-managed entity may be defined as a device such as Web Server, Proxy Server, Domain Name Server, Database Server, Web Front-End Server, File Server, Email Server, E-Commerce Server, Real-time Communication Server, Content Management Server, FTP Server, Streaming Media Server, Directory Server, Print Server, Mobile Information Server, and Application Server. While servers 16, 18 are shown as separate entities, it may be possible for one or more of servers 16, 18 to perform one or more of the functions of another one of more of servers 16, 18. For example, it may be possible that two or more of servers 16, 18 are implemented as a single server. It may also be possible for a single one of servers 16, 18 to be implemented as two or more separate (and possibly distributed) devices.

Exemplary Computer-Readable Medium of Client

FIG. 1.*c* is a diagram of a portion of an exemplary computer-readable medium that may be used by a Client 10. In one implementation, computer-readable medium may correspond to Memory 40 (in FIG. 1.*f*) of a Client 10. The computer-readable medium comprises of Operating System 50, Web Browser Software 52, Web Browser Plug-In Service Management 54, 56 and Plug-in software 12. Operating system 50 may include operating system software, such as the Microsoft Windows®, Apple MacOs, UNIX, or Linux Operating Systems. Web Browser software 52 may include software associated with a web browser, such as the Microsoft® Internet Explorer, Netscape Navigator®, Mozilla Firefox®, Google Chrome., or Apple Safari® browser.

The present invention (i.e., plug-in software) 12 displays a graphical user interface object to be presented within a web browser window. The graphical user interface object may operate in conjunction with the web browser. In another implementation, the graphical user interface object may be part of the web browser. In this latter implementation, the web browser may perform the functions of the graphical user interface object. For example, the graphical user interface object may interface between the web browser and network 14.

The Web Browser Plug-In software 12 of the present invention may be activated upon initiation of the Web Browser 52. Alternatively, the Web Browser Plug-In software 12 of the present invention 12 may be activated when instructed by a user. In either case, the Web Browser Plug-In software 12 of the present invention may take the form of a graphical user interface object, as described above. The Web Browser Plug-In software 12 of the present invention for presenting and implementing the Web application issue root cause identification functionalities described herein.

Exemplary Web Browser Plug-In Framework

As shown in the FIG. 1.*d*, the Web Browser 52 provides Services 54, which the Plug-In 12 can use, including a way for Plug-In 12 to register themselves with the Web Browser 52 and a protocol for the exchange of data with Plug-In Manager 56. Plug-in 12 depend on the Services 54 provided by the Web Browser 52. Conversely, the Web Browser 52 operates independently of the plug-in 12, making it possible for end-users to add and update plug-in 12 dynamically without needing to make changes to the Web Browser 52. Application programming interfaces (APIs) provide a standard interface, allows creating plug-in 12 that interact with the web browser.

Exemplary Computer-Readable Medium of Server and/or Network Infrastructure Device FIG. 1.*e* is a diagram of a portion of an exemplary computer-readable medium that may be used by Server 16, 18 and Network Infrastructure Device 20,22. In one implementation, computer-readable medium may correspond to Memory 40 (in FIG. 1.*f*) of a Server 16, 18 and Network Infrastructure Device 20,22. In one implementation, computer-readable medium may include an operating system 60, Client Agent Interaction Service Module 62, Monitoring Module 64 and Data Collection Module 66.

More specifically, operating system 60 may include operating system software, such as the Microsoft Windows®, Apple MacOs, UNIX, Network Operating Systems, Cisco IOS, APPLE IOS or Linux Operating Systems.

Exemplary Distributed Client/Server Architecture

FIG. 1.*f* is an exemplary diagram of a client, server and network managed entities (hereinafter called "distributed client/server entity"), which may correspond to client 10 and/or one or more Network Management Protocol NMP enabled devices such as Servers 16,18, and Network Infrastructure Devices 20, 22. The distributed client/server entity may include a bus 30, a processor 32, a main memory 40, a read only memory (ROM) 38, a storage device 36, an input device 42, an output device 44, and a communication interface 34. Bus 30 may include a path that permits communication among the elements of the distributed client/server entity.

Processor 32 may include a processor, microprocessor, or processing logic that may interpret and execute instructions. Main memory 40 may include a random access memory (RAM) or another type of dynamic storage device that may store information and instructions for execution by processor 32. ROM 38 may include a ROM device or another type of static storage device that may store static information and instructions for use by processor 32. Storage device 36 may include a magnetic and/or optical recording medium and its corresponding drive.

Input device 42 may include a mechanism that permits an operator to input information to the distributed client/server entity, such as a keyboard, a mouse, a pen, voice recognition and/or biometric mechanisms, etc. Output device 44 may include a mechanism that outputs information to the operator, including a display, a printer, a speaker, etc. Communication interface 34 may include any transceiver-like mechanism that enables the multi-tier entity to communicate with other devices and/or systems. For example, communication interface 34 may include mechanisms for communicating with another device or system via a network, such as network 14.

As will be described in detail below, the distributed client/server, consistent with the principles of the invention, may perform certain web application issue root cause identification-related operations. The distributed client/server entity may perform these operations in response to processor 32 executing software instructions contained in a computer-readable medium, such as memory 40. A computer-readable medium may be defined as a physical or logical memory device and/or carrier wave.

The software instructions may be read into memory 40 from another computer-readable medium, such as data storage device 36, or from another device via communication interface 34. The software instructions contained in memory 40 may cause processor 32 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

FIG. 1.g is an exemplary diagram illustrating concepts consistent with the principles of the invention. As shown in FIG. 1.g, a plug-in icon 102 may be associated with the web browser that is besides the address bar of the web browser. A user may activate web application issue root cause identification plug-in software 12 (in FIG. 1.d) when clicking on the icon 102. The Web application issue root cause identification plug-in software 12 displays the User Interface 104 in the bottom portion of a web browser window.

The User Interface 104 panel provides the features of plug-in user interface such as Capture button 106, Stop button 108, Clear button 110, Analyze button 112, Filter button 114, Statistics button 116, Tools button 118, Display region 100. The Capture button 106 provides user to start the principle operation of the present invention. The Stop button 108 provides to stop the operation, Clear button 106 provides to delete the network topology diagram presented in the display region 100. The Analyze button 112 provides detailed network trace information. The Filter button 114 provides ability choose a specific device network trace or display the information available in Network Topology Database for the specific device. The Statistics Button 116 displays network connections (both incoming and outgoing), routing tables, and a number of network interface statistics. The Tools button 118 provides ability to build the network topology diagram and it comprises of Upload Network Topology Diagram 120 menu, Add Device 128 menu, and Remove Device 132 menu. The Upload Topology Diagram 120 menu provides user to choose the network topology diagram from a file system for the given web application URL 202. Add Device 128 menu to insert a device from UI Devices Toolkit 130 to build a network topology diagram for the given web application URL 202. Remove Device 132 menu to delete a device from the built network topology diagram.

FIG. 1.h is an exemplary diagram illustrating the aspect of providing the ability to upload or construct network topology diagram of web application. In one aspect, user may upload the network topology diagram of web application by selecting the upload network topology diagram 120 from tools menu 118. The present invention displays file upload window 122 that contains a text box control and a browse button 124 that enable users to select a network topology diagram to upload. The present invention notifies the user that it uses the web browser logged on credentials to enable the Monitoring agents on the devices presented in the uploaded network topology diagram 126. Add Device 128 provides an option to add the device into the network topology diagram or to build a new network topology diagram for the web application. User may choose the graphical representation of device from the UI Devices Toolkit 130. Also, user may leverage the UI Devices Toolkit 130 to add new device into the existing network topology diagram if required. The present invention provides an option to remove the device from network topology diagram by using Remove device 132.

EXAMPLE

FIGS. 2.a-2.e are diagrams that illustrate the graphical user interface for the example of operation according to an implementation consistent with the principles of the invention. FIG. 2.a illustrates the detailed operation of the invention, user clicks on the plug-in icon 102 to initiate the operation, which displays the plug-in interface 104 in the bottom of web browser. As shown in FIG. 2.a, the invention shows the outcome to reach web application URL 202 that there is no issue occurred while rendering the web document 204 for the web application URL 202 with time duration 206 to reach each devices presented in the network topology of web application.

FIG. 2.b illustrates an exemplary example of present invention. A user receives an exception as "page can not be displayed" 208 in the web browser window for the web application URL 202. The present invention highlights the device 210 by changing the color of the device in the response of Trap notification received from Directory server 210 while performing the HTTP request for the given URL 202. User clicks on the Directory Server 210 to know more about issue occurred in the Directory Server 210. The plug-in shows detailed user-friendly message for the issue occurred in the Directory Server 210 along with suggestion using web search 214.

FIG. 2.c illustrates another example for operation of present invention. The web browser exhibits the exception 216 as "Server Application Unavailable" for the web application URL 202. The application pool of web site stop working due to that server object logs an entry in the event log of web application server 218. Due to this, the monitoring agent of web application server 218 sends the Trap notification to the plug-in 12 using Network command. The Core Engine 410 (FIG. 4) initiates the depiction engine 422 to highlight the web application server 218 as changing the color of the web application server using the user interface module 404. The Core Engine 410 of the present invention triggers the Networking Manager 414 to retrieve the information related to the Trap from the web application server 218. The monitoring agent collects the information related to the Trap and sends it to the present invention as response. Once the information is received, the Core Engine 410 builds the user-friendly error message 220 with the user preferred search engine URL 222 and appends with collected keywords from the received information and then stores it in the depiction back-end 420. This user-friendly error message 220 pops-up when user clicks on the highlighted device 218.

As another example shown in FIG. 2.d, the present invention highlights the DNS server 226 as the root cause for exception 224 displayed in the browser. As illustrated in the user-friendly error message popup 228, the Trap got generated in the DNS server 226 during the web request. The plug-in 12 receive the information related to the Trap from the DNS server 226 monitoring agent. The Core Engine 410 checks if any existing entries for the event id 157 and DNS Server error. There is no match available in the Root Cause Knowledge Base 428 for the received error, hence the Core Engine 410 does not fill the words in the Cause section on the template which is provided by the Message Template Provider 418. However, the Core Engine 410 builds a user-friendly error message by extracting keywords (i.e., Event ID 157, DNS Server) from the received information and appending it with user preferred web search URL 230.

Similarly, as shown in FIG. 2.e, another example of present invention is presented. Users of the web application are already connected to their web site URL 202 and they click a link on the home page to visit another Web page on their site, they receive the following error message: "There is an unexpected error occurred" 232. It is hard to find out where exactly the issue is caused, as there are no detailed exception details displayed in the web browser. Nevertheless, the present invention provides more detail on the device causing the issue by highlighting the device 234 in the diagram. During accessing the URL 202 presented in the web browser address bar, the Database Server 234 service is stopped due to NetLogon service does not start on the service. The root cause for the issue occurred in the database is being identified because there is an entry available in the Root Cause Knowledge Base 428. Once the root cause information is retrieved from the Root Cause Knowledge Base 428, the Core Engine 410 fills the root cause information in the Cause section of user-friendly error message template. After the keywords (i.e., Error 1068, MSSQLSEREVR) from taken from the received information of database server device 234, the Core Engine 410 appends it with user preferred web search URL and displays the user-friendly error message 236 for the exception 232 displayed when user requested.

Exemplary Processing

FIGS. 3.a-3.b are the flow charts illustrating the principles of present invention. In Act 302, the principle operation is initiated by the user action using capture button. When capture button is clicked by user the present invention initiates a network trace to discover the devices for the given web application URL. In one embodiment, the web browser plug-in 12 provides ability to user to upload the network topology diagram and another embodiment, the web browser plug-in 12 provides ability to user to build the network topology diagram using UI Devices Toolkit.

In Act 304 the present invention installs the Client Service Agent on each of the devices associated with the web application. If installation was not successful the present invention enables the Simple Network Management Protocol (SNMP) agent on the device to notify the plug-in 12 for device activity or system file changes as shown in Act 306. If installation is successful it configures the client agent service to monitor device state and notify plug-in 12 if any file or device states changes as shown in Act 308.

In Act 310, the present invention extracts the device information like IP address, device role and provides the IP addresses of the detected devices to the Networking Manager which stores the information to the Network Topology Database as show in Act 312. Based on the received information the network topology diagram is plotted as shown in Act 314.

In Act 316, the present invention captures the network packets between devices relating to the given web application URL. In Act 318, the present invention splits the packet information based on protocols such as TCP, HTTP, UDP related to the web request and stores them into the Network Topology Database as shown in Act 320.

In Act 322, the present invention highlights the network path as the request moves between the devices according to the captured network and HTTP information. In Act 324, when user clicks on the highlighted network path in between the devices, it displays the captured network packet information in a user-friendly message as shown in Act 326.

Exemplary Processing when Issue Notified

FIG. 3.b illustrates the principle of operation in accordance to the present invention when TRAP/issue has been identified in the fault device and notified to the plug-in 12.

In Act 328, when TRAP manager receives the notification from fault device, it notifies the Networking Manager to notify the Core Engine to highlight the device in the web application network topology diagram.

In Act 330, the Networking Manager sends a request to the faulted device to collect syslog message and any information available related to the error. The faulted device sends the response with information related to the error from the device. The information could be collected from the application log, web server log, syslog or device Information Base. This information is being detected by the Monitoring Agent 24 for the event changes that happened during the web request. Event changes could be system activity change or file change presented in the device. In Act 332, the received information is being optimized to construct the custom error message by extracting the error code from the received information.

In Act 334, the core engine leverages the web browser plug-in 12 to retrieve the user preferred web browser search engine settings. The web browser provides the ability to access a search engine using Search Plug-in, without having to go to the engine's website first. A search plug-in is a small text file that tells the browser what information to send to a search engine and how the results are to be retrieved. In addition, it provides an ability to user to set their preferred search engine.

In general, most of the web browsers search plug-in stores the user-defined settings in the XML file. Example, for the Firefox web browser, the present invention retrieves the user preferred search engine from Condition attribute of the MozParam XML node, websearch base query URL is being retrieved from template attribute of URL XML node and value of q parameter.

```
<Url type="text/html" method="GET"
    template="http://www.google.com/search">
<Param name="q" value="{searchTerms}"/> and
    <MozParam name="client" condition="defaultEngine"
    trueValue="firefox-a" falseValue="firefox"/>
```

In Act 336, the extracted error code as mentioned in the Act 332 will be checked with Root Cause Knowledge Base to determine if any existing entries available for the error code. If not, the keywords extracted from the received information is appended with the search engine URL as shown in the Act 338.

In Act 340, the user-friendly error message template is being built using the keywords/best bets from the received error message of faulted device and appending the keywords/best bets with web search query URL. Keywords/best bets may include the identification number of event for the related error occurred in the faulted device, managed device type, and error description.

In Act 342, if user clicks on the highlighted device in the network topology diagram then the present invention displays the built user-friendly message as shown in Act 344.

Exemplary Operations of Client Service Agent

FIG. 3.c. illustrates the principle of operation of Client Service Agent in accordance to the present invention.

In Act 346, the Client Service Agent or network monitoring agent is being enabled and establishes the relationship between the device and plug-in 12. In one embodiment, the client agent is being configured to monitor the file system and device state changes. In another embodiment, the network monitoring agent is configured to monitor the file system and device state changes.

As shown in Act 348, when any event such as file or device state changes occurs during the web application request, the TRAP is generated relating to the occurred event and it is being sent to the Plug-in 12 (NMS) as shown in Act 350.

In Act 352, when Client Service Agent or network monitoring agent receives the request from NMS (i.e., Plug-in 12), it collects the data related to the event occurred in the device.

In Act 354, the Client Service Agent or network monitoring agent retrieves the information related to the occurred event from the changed file system or device log and then sends them to the plug-in 12 as shown in Act 356.

Functional Architecture for Extending the Web Browser Capabilities of Web Application Issue Root Cause Identification FIG. 4 is high-level block diagram of a present invention that may perform one or more of the operations discussed above and below. The present invention used by web browser of user computer is connected to multiple managed devices 450 via Network 14. The plug-in software 12 of the present invention comprises of three major modules such as User Interface Layer 402, Plug-in Core Module 408, and Network Trace Module 430.

The User Interface Layer 402 comprises of User Interface 404 and User Interface (UI) Devices Toolkit 406. The User Interface subsystem is the layer between the user and the Core Engine and provides features such as Capture button 106, Stop button 108, Clear button 110, Analyze button 112, Filter button 114, Statistics button 116, Tools button 118, Display region 100 (in FIG. 1.h).

The UI Devices Toolkit 406 is closely coupled with User Interface 404 and provides multiple stencils of servers, and network infrastructure devices to user to construct the network topology diagram for the given web application URL. It represents both Server and Network Infrastructure Devices 130 (in FIG. 1.h).

The Plug-In Core Module 430 comprises of Depiction Engine 422, Depiction Back-end 420, Web Browser Plug-in Service Interface 412, HTTP Event Manager 424, Networking Manager 414, Network Topology Database 416, Message Template Provider 418, Exception Message Handler 426, Root Cause Knowledge Base 428, and Core Engine 410.

The Depiction Engine 422 is responsible for drawing the graphical user interface 404 and retrieves the information of adverse event detected from Depiction back-end 420 to the screen. The Depiction Engine 422 renders content based on Depiction back-end 420 which provides a set of platform independent data structures including: geometrical primitives, color definitions, font specifications, image abstraction, rendering context, adverse event context, exception context font metrics, image, regions, and alpha blender.

Depiction back-end 420 is responsible for temporarily holding the information needed by Depiction Engine and it acts a temporary database that stores the information provided by the Core Engine. It closely coupled with Depiction engine 422 and Core Engine 410 where Depiction engine 422 leverages the information to display in the user interface 404.

The Web Browser Plug-in Service Interface 412 refers to a point of interaction between Core Engine 410 of present invention and web browser. This allows a Core Engine 410 to function independently while using interfaces to communicate with web browsers. In some of embodiments, it provides the mapping interface between Core Engine 410 with web browser engine by registering the present invention into web browser plug-in repository. In some of embodiments, the Core Engine 410 leverages the web browser plug-in service interface 412 to retrieve the user preferred search engine settings.

The HTTP Event Manager 424 comprises the HTTP Event Gatherer 446 and Event Schematizer 448. It is closely coupled with Networking Manager 414 and Core Engine 410. Once the network trace is received from the Networking Manager 414, the HTTP Event Manager 424 triggers the Event Gatherer 446 module to fetch the HTTP protocol information from the captured network trace. The fetched HTTP protocol related information is send to the Event Schematizer 448 to parse and build a user readable friendly message to present in the Plug-In User Interface Module 402. This provides a user-friendly message of the captured network trace that is comprehendible by the users whom do not have knowledge about HTTP result code or network capture details.

The Networking Manager 414 holds the network management system entities that monitors and controls the network-managed devices. In one embodiment, in response to the Core Engine 410 request to detect the devices for the given web application URL, Networking Manager 414 leverages the ICMP Trace 434 module of Tracapture Manager 432 to initiate the ICMP trace to detect devices. The Networking Manager 414 invokes Agent Handler 440 to enable the Client Service Agent on the detected devices. There are four basic commands used by Networking Manager 414 to monitor and control the managed devices: read, write, trap, and traversal operations. The read command examines the variables that are kept by the managed devices. The write command changes the values of the variables stored by the managed devices. A traversal operation looks to find out what variables a managed device supports and gathers information from the supported variable tables. The trap command is used by the managed devices to report the occurrence of certain events to Networking Manager 414.

The Networking Manager 414 may set the values in the information base of Client Service Agent to monitor the log File System changes and device counter measure changes. The Client Service Agent 24 may use the File System Watcher entity to listen for changes of the log files in a device. In one embodiment, Networking Manager 414 leverages the Packet Capture 436 module of Tracapture Manager 432 to initiate the Network Trace between devices.

The captured network packet information is being stored in the Temp table of Network Topology Database 416. The collected trace is simultaneously sent to HTTP Event manager to separate the HTTP related information. When TRAP message received by the TRAP manager 440, the Networking Manager 414 triggers the Core Engine 410 to highlight the fault device in the network topology diagram that is presented in the display region 100. The Networking Manager 414 sends the request to receive the log messages related to the Trap notification. Each activity is being stored in the Networking Topology Database 416.

The Network Topology Database 416 is a collection of network trace and managed device data items organized as a set of formally described tables from which data can be accessed easily. It comprises of four major database tables such as Webs, ManagedDevices, Temp, NetTrace and each database tables are organized using a model of vertical columns and horizontal rows, the cell being the unit where a row and column intersect. Webs table that holds the web application information presented in the display region 100. The network topology information of given web application URL is stored in the table and identified by a unique key index value (i.e., siteid). The device name or description, IP address of managed device information are being extracted from the given network diagram and these managed device information are being stored in ManagedDevices table. ManagedDevices table has DeviceId as a primary index key and siteid as a foreign key. Temp Table holds the network trace information from one device to another device and this information is stored in the From, To and Trace columns. When networking manager receives the network packet capture from one device to another device, it stores the information in the Temp table. This stored information is sent to the HTTP Event Manager 424 to isolate the HTTP related information. The detailed packet capture information is being stored in the NetTrace table.

The Message Template Provider 418 holds the user-friendly exception message templates. The Core Engine 410 leverages the Message Template Provider 418 while constructing the user-friendly exception message for error message occurred in the web application.

The Exception Handler 426 analyzes the received error message by extracting the best bet or keywords from the received error message. When an error message is received, the Exception Handler 426 extracts the keywords and checks against Root Cause Knowledge Base 428. If no matching entry is found, the error message is stored with error id and keywords along with web search suggestion URL. If a matching entry is found, Exception Handler 426 retrieves the entry for the error id and keywords and appends with the web search suggestion URL.

The Root Cause Knowledge Base 428 is a special kind of database for storing managed devices error log messages. Each log message is being stored with log or error id as unique index key. The Core Engine checks if any existing information is available in the Root Cause Knowledge Base 428 for the received log/error message. If there is no entry available in the Root Cause Knowledge Base 428 for the received log/error message then the received error or log message is stored in the Root Cause Knowledge Base 428 along with web search suggestion URL for future purpose.

The Core Engine 410 leverages the Web browser Plug-in Service Interface 412 to register with the web browser and exchange the data with web browser. It loads plug-in user interface 104 (in FIG. 1.*h*) when user types the URL. It triggers UI Devices Toolkit 406 when user wants to construct the network topology diagram for their web application URL. In one of the embodiment, Core Engine 410 triggers Networking Manager 414 to validate the constructed network topology diagram by using ICMP trace for the given web application URL. In another embodiment, the Core Engine 410 initiates the Networking Manager 414 to do a ICMP trace for the given web application URL. The detected devices information is being used to plot the network topology diagram in the display region 100. The detected device information is being stored in the Network Topology Database 416.

When a user initiates the operation by clicking on the Capture button 106, the Core Engine 410 triggers Networking Manager 414 to initiate the network trace between each device presented in the network topology diagram. It invokes HTTP Event Manager 424 to identify the devices in the network trace and highlights the network path in the network topology diagram for the identified devices. In one embodiment, the Core Engine 410 builds the user readable trace information between the devices and stores them in the Depiction back-end 420. When user clicks on the highlighted network path in the network topology diagram, it displays the user readable trace information. In another embodiment, the Core Engine 410 highlights the faulted device when Trap Notification is received from the managed device presented in the network topology diagram. In another embodiment, the Core Engine 410 triggers the Networking Manager 414 to send the request to retrieve the detailed log information for the Trap Notification. In one embodiment, the Core Engine 410 retrieves the best bets/keywords from the received detailed log information to append with web search suggestion URL. The Core Engine 410 leverages the Web Browser Plug-in Service Interface 412 to determine the user preferred search engine settings from web browser to generate the web search query URL and builds the user-friendly message with web search suggestion URL for the faulted device. In addition, the Core Engine 410 leverages Exception Handler 426 to check if any log entries are available for the received error/log message. Once the user-friendly message is constructed with web search suggestion, it stores them in the depiction back-end 420 and displays it in the user interface 404 when user clicked on the highlighted device.

The Tracapture Manager 432 sends a sequence of Internet Control Message Protocol (ICMP) echo request to detect a list of devices in the path to reach the given web application destination host. It captures the network packets, at full network speed, between each device presented in the network topology diagram of the web application. It comprises of two modules such as ICMP Trace 434, and Packet Capturer 436.

The ICMP Trace 434 module contains a client interface to Internet Control Message Protocol (ICMP). It is being used by the Tracapture Manager 432 to verify an end-to-end network path is operational and provides information on each of the intermediate devices to be found along the network path from the sender to the receiver. ICMP Trace module uses ICMP echo messages that are addressed to the target IP address.

An example:
>traceroute portal.corp.com (212.58.224.131), 64 hops max, 40 byte packets
1 10.10.10.1 (10.10.10.1) 51.940 ms 18.491 ms 1.260 ms
2 lo0-plusnet.ptn-ag2.plus.net (195.166.128.53) 49.263 ms 55.061 ms 53.525 ms
3 ge1-0-0-204.ptn-gw2.plus.net (84.92.3.106) 139.647 ms 52.525 ms 127.196 ms
4 gi1-1-22.ptn-gw5.plus.net (212.159.4.6) 76.505 ms 57.524 ms 52.404 ms
5 rt0.thdo.bbc.co.uk (212.58.239.25) 89.200 ms 49.666 ms 144.629 ms
6 212.58.238.133 (212.58.238.133) 48.786 ms 68.650 ms 51.599 ms As data streams flow across the network, the packet capturer 436 captures each packet and provides it to the Networking Manager 414 to decode the packet's raw data and analyze its content according to the appropriate specifications provided by the Core Engine 410. The captured information is decoded from raw digital form into a human-readable format that permits users of the present invention to easily review the exchanged information. It may use pcap application programming interface (API) for capturing network traffic, in addition, it may use libpcap or Winpcap library depending on the device operating system supports.

The Agent Handler 440 provides the interface between the Networking Manager 414 and the monitoring agents presented in the devices. The Agent Handler 440 looks for the Client Agent Service Agent (installed by the present invention) in the detected device for the given web application network topology. If Agent Handler 440 could not find the Client Service Agent then it may uses the SNMP or RMON Probe to communicate with managed devices 450. There are four basic commands used by Agent Handler 440 to communicate with the managed devices: read, write, trap, and traversal operations. The read command examines the variables that are kept by the managed devices. The write command changes the values of the variables stored by the managed devices. A traversal operation looks to find out what variables a managed device supports and gathers information from the supported variable tables. The trap command is used by the managed devices to report the occurrence of certain events to the Agent Handler 440.

TRAP Handler 442 receives and logs Traps from the managed devices. Trap Handler allows the instantaneous reporting of alert notifications to Networking Manager 414. Each trap is decoded and the data is presented to the Networking Manager 414.

LOG Handler 444 sends a message request to retrieve Trap related information from the device. It may also request the monitoring agent 24 in the devices to collect file system changes when the event occurred. File system changes may include application log, web server log, event or sys log changes. The received log information is sent to Networking Manager 414 to extract the keywords/best bets to construct the user-friendly message.

The Client Service Agent comprises of Client Agent Interaction Service 452, Monitoring Module 454, and Data Collection Module 456. The Client Service Agent communicates with Agent Interaction Service 438 of web browser plug-in 12. The Client Agent Interaction Service 452 is being used to establish the communication path between Client Service Agent and Agent Interaction Service 438.

The Monitoring Module 454 monitors the device object changes such as the log File System changes and device counter measure changes. The Monitoring Module 454 may use the File System Watcher entity to listen for changes of the log files in a device. When changes on the device objects are detected then it triggers the TRAP to the Agent Handler 440 through Client Agent Interaction Service 452.

The Data Collection Module 456 responds to the Networking Manager 414 for the detailed information for the generated TRAP. The Data Collection Module 456 then collects the changed objects from the device and filters the changed objects information for the time period of the event.

An Intranet Example

The following example illustrates the more features of present invention for the exemplary web application hosted in the intranet environment. FIGS. 5a-5f are the examples representing the some embodiments of present invention operation. In some embodiments, graphical user interface 5.a includes the following elements, or a subset or superset thereof: Upload network topology diagram 120 that is uploading the computer network diagram for intranet web application; Add device 128 that provides to include one or more device into the computer network diagram of intranet web application; Remove device 132 that provides to delete device from the network diagram. FIG. 5.a illustrates how user builds the network topology diagram for the given web application URL 504. In some embodiments, the present invention provides an ability to build a network topology diagram on the fly using Add device 128 and UI Devices Toolkit 130 (FIG. 1.h). As shown in FIG. 5.a, a network topology diagram of intranet web application (given URL 504) which is subjected to inspect includes the following devices, device type/role and their internet protocol addresses or a subset or superset thereof: user 514, user's desktop machine 516, IP address of user desktop machine 518, role 520, network path 522, network switch 524, IP address of network switch 526, Domain Name Server (DNS) 528, IP address of DNS 530, role 532, Proxy Server 534, IP address of Proxy Server 536, role 538, Directory Server 540, IP Address of Directory Server 542, role 544, Web Server 546, IP Address of Web Server 548, role 550, Database Server 552, IP Address of Database Server 554, role 556.

In some embodiments, the present invention displays the Packet Capture information 558 that includes the human-readable friendly information that displays a detailed packet capture when user hovers on the highlighted network path 522 as shown in the FIG. 5.b. This information is being retrieved from the Trace table of Network Topology Database 416. As mentioned earlier, the network packet information in between each devices are being stored in the network topology database 416. The network capture information includes where the request originated from, protocol being used, what contains in each frame similarly the HTTP capture information includes byte count, time taken, byte sent, byte received, method, HTTP status result code, type of the file, and URL.

In some embodiments, the present invention provides information about time 206 taken to complete the network path between one devices to another device as shown in FIG. 2.a As illustrated in the FIG. 5.c, user is receiving "the page cannot be displayed" error message 506 for the given URL 504. User would like to troubleshoot where or which device causes the issue, so user/web application support professional activates the plug-in (i.e., present invention) and builds the network topology diagram as mentioned in the FIG. 5.a and then initiates the capture 106 button to troubleshoot the issue. While web application request goes through the network switch 526, there is a trap generated from the network switch 526 due to LAN failure. This Trap is notified to the web browser plug-in and plug-in requests for detailed information related to the trap from the network switch 526. The monitoring agent on the network switch 526 collects the information related to trap and sends it to the web browser plug-in where the received information is being constructed as user-friendly error message along with web search suggestion 562.

FIG. 5.d illustrates another example to show why user is receiving "HTTP Error 401.2—Unauthorized" for the given web application URL 504. During the web application authentication the Directory Server 544 throws a failed authentication message on the syslog due to this and a Trap is generated and notified to the present invention. The present invention spontaneously highlights the Directory Server 544 as response to the received Trap and collects detailed Trap related information from device using Network commands. The detailed message is being displayed as user-friendly error message 564 indicating his/her user account got locked, indicating the reason for the unauthorized exception. As illustrated in 564, the Core Engine 410 of the present invention found a match for the received error message/id from the Root Cause Knowledge base 428. The Cause section in the user-friendly message template is filled with "user account may got locked".

FIG. 5.e illustrates an exemplary graphical user interface to show the reason for the general error message 510 displayed in the web page. In this particular example, the present invention highlights Domain Name Server 528 to show the root cause for the error message 510 displayed. When user hover on the DNS server 528, the present invention displays the user-friendly message 566 to show that there is a DNS write failed on the DNS server 528 which caused them to receive the error message 510.

As exemplary graphical user interface illustrates in FIG. 5.f, the present invention identifies the root cause of an issue that displayed in the web browser window by highlighting the database server 552 as there is a critical event occurred which stops web application to work. The web application suddenly stopped working and shows an unclear error message 512 displayed in the web browser window that makes IT support professional or user to get confused and hard to debug. But the present invention shows the reason for the unclear error message 512 displayed in the web browser window by highlighting database server 552 and collects the information related to the Trap generated from the Database Server 552 and sends to the plug-in. The plug-in displays the user-friendly error message 582 when user clicks on the highlighted database server 552.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention, its practical applications, to thereby enable others skilled in the art to best utilize the invention, and various embodiments with various modifications as are suited to the particular use contemplated.

For example, while series of acts have been described with regard to FIG. 3.a-c, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

What is claimed is:

1. A non-transitory computer-readable storage medium storing instructions that when executed by a computer cause the computer to perform a method for extending the capabilities of a web browser to pinpoint exactly why, where and which object is causing the error condition in the web browser for the given web application and provide the on-demand detailed user-friendly message about the error condition along with web search suggestion for further analysis, the method comprising:
   Plotting the graphical representation of the network topology diagram of given web application in the web browser plug-in display region,
   Highlighting the live traffic path along with time taken to reach between the devices in the network topology diagram during the web application request flow,
   Displaying a human readable message for the live traffic information when user clicks on the highlighted network path between devices,
   Pinpointing the faulted device in the network topology diagram by highlighting the faulted device,
   Displaying the human readable message for the error occurred when user clicks on the highlighted device in the network topology diagram,
   Providing the on-demand detailed user-friendly message about the error condition along with web search suggestion URL.

2. The non-transitory computer-readable storage medium of claim 1 further comprising:
   Drawing the graphical representation of the network topology diagram by detecting the list of devices in the path to reach the given web application destination host,
   Providing an ability to upload the existing network topology diagram,
   Providing the UI Devices Toolkit to draw the network topology diagram by drag and drop of the stencils in the plug-in display region,
   Validating the network topology diagram for the given web application and storing them into the network topology database.

3. The non-transitory computer-readable storage medium of claim 1, wherein:
   Web search suggestion URL is built by determining the user preferred search engine settings from the web browser and concatenating the keywords from the error message received from the faulted device.

4. The non-transitory computer-readable storage medium of claim 1, wherein:
   An object is at least one of:
   a server,
   a networking infrastructure device,
   a computer network,
   a personal computer,
   a smart phone,
   a personal digital assistant,
   a laptop or another type of computation or communication device,
   a local area network,
   a wide area network,
   an intranet,
   the internet,
   a router,
   a switch,
   a repeater,
   a gateway,
   a bridge,
   a bridge router,
   a multiplexer,
   an ISDN terminal adapter,
   a line driver,
   a digital media receiver,
   a wireless network interface controller,
   a proxy server,
   a firewall,
   a network address translator,
   a protocol converter,
   a wireless network interface controller,
   a modem,
   a web server,
   a domain name server,
   a database server,
   a web front-end server,
   a file server,
   an email server,
   a real-time communication server,
   a content management server,
   a ftp server,
   a streaming media server,
   a directory server,
   a print server,
   a mobile information server,
   an application server.

5. The non-transitory computer-readable storage medium of claim 1, wherein:
   Faulted device is at least one of:
   a server,
   a networking infrastructure device,
   a computer network,
   a personal computer,
   a smart phone,
   a personal digital assistant,
   a laptop or another type of computation or communication device,
   a local area network,
   a wide area network,
   an intranet,
   the internet,
   a router,
   a switch, a repeater,
a gateway,
a bridge,
a bridge router,
a multiplexer,
an ISDN terminal adapter,
a line driver,
a digital media receiver,
a wireless network interface controller,
a proxy server,
a firewall,
a network address translator,
a protocol converter,
a wireless network interface controller,
a modem,
a web server,
a domain name server,
a database server,
a web front-end server,
a file server,
an email server,
a real-time communication server,
a content management server,
a ftp server,
a streaming media server,
a directory server,
a print server,
a mobile information server,
an application server.

6. Computer instructions stored on a non-transitory computer-readable medium, configured to cause one or more processors to perform the operations of adding the extra capabilities to web browser to identify exactly why, where and which object is causing the error condition in the web browser for the given web application and provide the on-demand detailed user-friendly message about the error condition along with web search suggestion for further analysis, the operations comprising:
Plotting the graphical representation of the network topology diagram of given web application in the web browser plug-in display region,
Highlighting the live traffic path along with time taken to reach between the devices in the network topology diagram during the web application request flow,
Displaying a human readable message for the live traffic information when user clicks on the highlighted network path between devices,
Pinpointing the faulted device in the network topology diagram by highlighting the faulted device,
Displaying the human readable message for the error occurred when user clicks on the highlighted device in the network topology diagram,
Providing the on-demand detailed user-friendly message about the error condition along with web search suggestion URL.

7. The instructions of claim 6 further comprising:
Drawing the graphical representation of the network topology diagram by detecting the list of devices in the path to reach the given web application destination host,
Providing an ability to upload the existing network topology diagram,
Providing the UI Devices Toolkit to draw the network topology diagram by drag and drop of the stencils in the plug-in display region,
Validating the network topology diagram for the given web application and storing them into the network topology database.

8. The instructions of claim 6, wherein:
Web search suggestion URL is built by determining the user preferred search engine settings from the web browser and concatenating the keywords from the error message received from the faulted device.

9. The instructions of claim 6, wherein:
An object is at least one of:
a server,
a networking infrastructure device,
a computer network,
a personal computer,
a smart phone,
a personal digital assistant,
a laptop or another type of computation or communication device,
a local area network,
a wide area network,
an intranet,
the internet,
a router,
a switch,
a repeater,
a gateway,
a bridge,
a bridge router,
a multiplexer,
an ISDN terminal adapter,
a line driver,
a digital media receiver,
a wireless network interface controller,
a proxy server,
a firewall,
a network address translator,
a protocol converter,
a wireless network interface controller,
a modem,
a web server,
a domain name server,
a database server,
a web front-end server,
a file server,
an email server,
a real-time communication server,
a content management server,
a ftp server,
a streaming media server,
a directory server,
a print server,
a mobile information server,
an application server.

10. The instructions of claim 6, wherein:
Faulted device is at least one of:
a server,
a networking infrastructure device,
a computer network,
a personal computer,
a smart phone,
a personal digital assistant,
a laptop or another type of computation or communication device,
a local area network,
a wide area network,
an intranet,
the internet,
a router,
a switch,
a repeater, a gateway,
a bridge,
a bridge router,
a multiplexer,
an ISDN terminal adapter,
a line driver,
a digital media receiver,
a wireless network interface controller,
a proxy server,
a firewall,
a network address translator,
a protocol converter,
a wireless network interface controller,
a modem,
a web server,
a domain name server,
a database server,
a web front-end server,
a file server,
an email server,
a real-time communication server,
a content management server,
a ftp server,
a streaming media server,
a directory server,
a print server,
a mobile information server,
an application server.

11. A system comprising:
one or more processors; and
a computer-readable storage device storing instructions that, when executed by the one or more processors, cause the one or more processors to add extra capabilities to web browser to pinpoint exactly why, where and which object is causing the error condition in the web browser for the given web application and provide the on-demand detailed user-friendly message about the error condition along with web search suggestion for further analysis, the operation comprising:
Plotting the graphical representation of the network topology diagram of given web application in the web browser plug-in display region,
Highlighting the live traffic path along with time taken to reach between the devices in the network topology diagram during the web application request flow,
Displaying a human readable message for the live traffic information when user clicks on the highlighted network path between devices,
Pinpointing the faulted device in the network topology diagram by highlighting the faulted device,
Displaying the human readable message for the error occurred when user clicks on the highlighted device in the network topology diagram,
Providing the on-demand detailed user-friendly message about the error condition along with web search suggestion URL.

12. The system of claim 11, wherein:
Web search suggestion URL is built by determining the user preferred search engine settings from the web browser and concatenating the keywords from the error message received from the faulted device.

13. The system of claim 11, wherein:
An object is at least one of:
a server,
a networking infrastructure device,
a computer network,
a personal computer,
a smart phone,
a personal digital assistant,
a laptop or another type of computation or communication device,
a local area network,
a wide area network,
an intranet,
the internet,
a router,
a switch,
a repeater,
a gateway,
a bridge,
a bridge router,
a multiplexer,
an ISDN terminal adapter,
a line driver,
a digital media receiver,
a wireless network interface controller,
a proxy server,
a firewall,
a network address translator,
a protocol converter,
a wireless network interface controller,
a modem,
a web server,
a domain name server,
a database server,
a web front-end server,
a file server,
an email server,
a real-time communication server,
a content management server,
a ftp server,
a streaming media server,
a directory server,
a print server,
a mobile information server,
an application server.

14. The system of claim 11, wherein:
Faulted device is at least one of:
a server,
a networking infrastructure device,
a computer network,
a personal computer,
a smart phone,
a personal digital assistant,
a laptop or another type of computation or communication device,
a local area network,
a wide area network,
an intranet,
the internet,
a router,
a switch,
a repeater,
a gateway,
a bridge,
a bridge router,
a multiplexer,
an ISDN terminal adapter,
a line driver,
a digital media receiver,
a wireless network interface controller,
a proxy server,
a firewall,
a network address translator, a protocol converter,
a wireless network interface controller,
a modem,
a web server,
a domain name server,
a database server,
a web front-end server,
a file server,
an email server,
a real-time communication server,
a content management server,
a ftp server,
a streaming media server,
a directory server,
a print server,
a mobile information server,
an application server.

* * * * *